(12) United States Patent
Kamata

(10) Patent No.: US 6,347,535 B2
(45) Date of Patent: *Feb. 19, 2002

(54) HEATING APPARATUS AND METHOD

(75) Inventor: Shigeto Kamata, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,334

(22) Filed: Apr. 20, 1999

(30) Foreign Application Priority Data

| Apr. 24, 1998 | (JP) | 10-115069 |
| May 27, 1998 | (JP) | 10-145770 |
| Sep. 16, 1998 | (JP) | 10-261829 |
| Mar. 24, 1999 | (JP) | 11-080387 |

(51) Int. Cl.[7] ............................................... C03B 11/12
(52) U.S. Cl. ........................ 65/29.19; 65/43; 219/446.1; 219/448.11; 219/448.17; 219/451.1
(58) Field of Search ..................... 65/29.19, 43, 58, 65/106; 219/446.1, 448.11, 448.17, 451.1

(56) References Cited

U.S. PATENT DOCUMENTS

| 4,130,408 A | * | 12/1978 | Crossland et al. | 65/43 |
| 4,269,617 A | * | 5/1981 | Shibuya et al. | 65/43 |
| 4,643,532 A | * | 2/1987 | Kleiman | 349/190 |
| 5,125,945 A | * | 6/1992 | Menihan et al. | 65/66 |
| 6,021,648 A | * | 2/2000 | Zonneveld et al. | 65/33.5 |

FOREIGN PATENT DOCUMENTS

| EP | 0776022 A2 | * | 5/1997 |
| JP | 10-55754 | | 2/1998 |

* cited by examiner

Primary Examiner—Sean Vincent
(74) Attorney, Agent, or Firm—Fitzpatrick, Cella, Harper & Scinto

(57) ABSTRACT

When an object to be heated is heated without temperature nonuniformity in its heated surface, unwanted thermal deformation can be suppressed, and thermal processing precision can be improved. For this purpose, a heat transfer plate for heating a plate-like object to be heated, and a base plate are stacked. A rod heater as a heat source is inserted in the heat transfer plate. The heat transfer plate has a larger thermal conductivity and smaller creep than the base plate.

6 Claims, 37 Drawing Sheets

HEATING APPARATUS AND METHOD

BACKGROUND OF THE INVENTION

The present invention relates to a heating apparatus and method and, more particularly, to a technique for supporting an object to be heated such as a glass plate and subjecting it to a uniform temperature process in order to uniformly heat it.

Conventionally, in a heating apparatus for uniformly heating an object to be heated, as shown in FIG. 37, a plurality of cartridge type rod heaters 213 are inserted in a plate 212 made of one material. Outputs from the rod heaters 213 are controlled by a controller 214 by referring to a temperature obtained by at least one temperature sensor (not shown) provided to the plate 212, thereby heating an object 1 to be heated. To decrease in-plane temperature nonuniformity of a heating surface 212a of the plate 212, a material such as an aluminum alloy having a large thermal conductivity is used. To prevent deformation of the plate 212, a material such as stainless steel having a small thermal conductivity and a large rigidity is used. Although a materials such as ceramics with a large thermal conductivity is an ideal material for use as the plate 212, ceramics is very hard to machine and expensive.

When a material having a large thermal conductivity is used to form the plate 212, if the plate 212 is, e.g., a 400-mm square aluminum alloy plate, a temperature distribution of ±3° C. or less near 200° C. and ±5° C. or less near 400° C. is achieved by controlling the rod heaters 213.

When a material having a small thermal conductivity but a large rigidity is used to form the plate 212, if the plate 212 is a 400-mm square plate, warp of the plate 212 is suppressed to 0.2 mm or less even after the plate 212 is subjected to a heat cycle of 400° C. or more.

As an apparatus for heating a flat plate such as a glass plate, one disclosed in Japanese Patent Laid-Open No. 10-55754 filed by the present applicant is available. The invention of this reference relates to a technique for adhering and heat-bonding two flat glass plates through a spacer. According to this technique, the flat glass plates are heated to a predetermined temperature by heating flat plates and are heat-bonded to each other.

Each heating flat plate of the above apparatus incorporates a heating means in itself and is supported on the base of the apparatus with a support member. In the apparatus shown in the above reference, the support member is made of a heat insulating material such as a ceramic member to cope with high temperatures.

In order to suppress thermal deformation of the plate 212 and to reduce its heat capacity and temperature distribution, if the plate of the heating apparatus is a 400-mm square plate, an in-plane temperature distribution of ±3° C. or less near 200° C. and ±5° C. or less near 400° C. is achieved. Even after the plate 212 is subjected to a heat cycle from room temperature to 400° C. or more, warp of the plate 212 must be suppressed to 0.2 mm or less.

A glass plate used in, e.g., a liquid crystal display, often undergoes a heating process in the display fabrication process. To process the display or to form and assemble elements at predetermined positions on a glass plate, deformation of the glass plate caused by heat must be prevented to increase positional precision and to increase processing precision and assembling precision. For this purpose, in the heating apparatus, the glass plate must be heated by using a plate having a least possible temperature distribution.

When forming display pixels and an optical filter on a glass plate, as the positional precision of each pixel and filter largely influences the image quality of the display, the glass plate as a substrate where pixels and filter are to be formed should not largely thermally deform by a positional error factor, i.e., a temperature nonuniformity or temperature gradient.

For example, when a glass plate having a length L=400 mm is heated from 20° C. to 220° C., it expands by $\Delta T \times L \times \alpha = (220-20) \times 400 \times (10 \times 10^{-6}) = 800$ μm where the coefficient of expansion of glass is $\mu = 10 \times 10^{-6}$. At this time, if a temperature distribution (nonuniformity) exists and a temperature gradient of 20° C. exists per 400 mm, $\Delta T \times L \times \alpha/2 = 20 \times 400 \times 10 \times 10^{-6}/2 = 40$ μm occurs, and a positional error of 40 μm occurs as compared to a case wherein the temperature is uniform. Depending on the precision required by the process, element formation, and assembly, the temperature gradient must be set to 10° C. or less. If the temperature increases uniformly and the glass plate expands uniformly, the actual or desired positions of the respective portions of the glass surface after deformation can be predicted. If irregular temperature nonuniformity or temperature gradient occurs, the glass plate deforms irregularly or nonuniformly. Then, it is difficult to predict the position of a desired portion of the glass plate.

For example, as the size of the display increases, the area of the object to be heated, e.g., a glass plate used in the display, increases, and the area of the plate of the heating apparatus also increases. When the area of the heating apparatus increases, the heat capacity increases naturally, leading to an increase in power consumption of the heating apparatus and an increase in heating and cooling times. For cooling, it is indispensable to increase the cooling capability and to add a cooling means. Hence, in the heating apparatus, particularly in relation to increased area of the object to be heated, temperature distribution of the heating apparatus must be minimized, as described above, and its heat capacity must be designed as small as possible.

SUMMARY OF THE INVENTION

When the area of the plate increases, in the above prior art, since the cartridge heaters are inserted in the tunnel holes formed in the plate, the depth of the holes and the length of the cartridge heaters increase. As for the hole depth, increasing the depth while maintaining the same diameter as that of the prior art is technically difficult, and highly precise hole formation is limited in depth. If the hole diameter is increased, while the processability increases and a deep hole can be formed easily, the plate thickness increases and the weight and heat capacity increase, leading to an increase in power consumption and heating and cooling times. For the heater, a length with which the heater can be fabricated with good precision for a certain diameter is limited. If the heater length increases, the heater diameter must be increased. As a result, the thickness of the plate into which this large-diameter heater is to be inserted increases. In this manner, if the area is increased without taking any special measure, the plate thickness increases due to limitations on the hole and heater, and the heat capacity increases more than the area increase. In other words, an issue of realizing a large plate area without increasing the heat capacity per unit area of the plate arises.

Along with a further increase in area of the plate of the heating apparatus, it has become necessary to enable free selection of the portion (region) to be heated by each heater and to perform temperature control of each heater separately, thereby reducing temperature distribution. For example, the temperature of the periphery of the plate decreases due to heat dissipation from the sidesurface. When outputs from heaters provided to the periphery of the plate are separately controlled to uniform the temperature, temperature distribution can be reduced. In the prior art, however, since the heaters are inserted in one direction of the plate, the thickness of the plate of the heating apparatus must be increased to prevent interference between the heaters in two directions, and the heaters must be set at different heights. As a result, the weight of the plate increases to increase its heat capacity, leading to an increase in power consumption and heating and cooling times. To enable a further plate area increase, temperature uniformity, and a small heat capacity, the heaters must be arranged at desired regions without increasing the plate thickness.

When a member to be heated is placed on a flat plate having a heating means and is heated, if the size of the member to be heated increases, the size of the heating flat plate increases accordingly. As a result, uniforming the heating state of the flat plate becomes difficult, and maintaining high flatness of the flat plate also becomes difficult.

Furthermore, the heating temperature must be increased depending on the material of the member to be heated to be heated. When the temperature of the flat plate also increases, maintaining high flatness of the flat plate becomes difficult.

In particular, when a glass material or the like is to be heated, as the heating temperature of the flat plate is high, the temperature of the flat plate is thermally transferred to the support member of the flat plate to expand it, affecting the flatness of the flat surface. As a result, the flatness of the flat plate suffers to impair the precision of heat bonding of the member to be processed.

In order to cope with the above problems, a measure must be taken against any temperature increase of the support member that supports the flat plate.

More specifically, to maintain high flatness of the flat plate, a plurality of support members must be provided to support the flat plate to increase the supporting rigidity, thereby maintaining high flatness of the heating flat plate.

For this purpose, the conditions for expansion and contraction of the respective support members must be set equal. However, depending on differences in structure of the respective support members, the heat capacities of the support members differ, and it is difficult to set equal conditions for expansion of all of the respective support members.

In the conventional heating apparatus, if a plate made of a material having a large thermal conductivity is used in order to decrease temperature nonuniformity, warp of the plate increases. On the other hand, if a plate made of material having a large rigidity is used to decrease warp of the plate, temperature nonuniformity of the plate increases. In other words, with the conventional heating apparatus, temperature nonuniformity and warp of the plate cannot both be solved at the same time.

An object to be heated is often influenced by a change in shape of the plate of the heating apparatus in contact with it. When the plate of the heating apparatus has a warp of 200 $\mu$m or more, a gap is formed between the plate and the object to be heated. Then, the object temperature becomes nonuniform and positional precision degrades. When the object to be heated is made of glass or the like, the object to be heated itself thermally deforms in accordance with the shape of the warped plate to degrade the processing precision. Therefore, any warp of the plate of the heating apparatus must also be minimized.

To decrease temperature nonuniformity of the heating apparatus, the heat capacity of the plate of the heating apparatus must be increased. If, however, the heat capacity of the plate of the heating apparatus is large, the heating and cooling times of the heating apparatus prolong. To shorten the heating time, the power consumption of the rod heaters that heat the heating apparatus must be increased. To shorten the cooling time, another cooling means must be provided, or the cooling capability of the existing cooling means must be increased. To heat a larger, heavier object in the future, a large heating apparatus, especially a heating apparatus for heating a large area, is required. Such a heating apparatus must have a larger power consumption since its heat capacity increases. An increase in power consumption leads to an increase in size and cost of the power facility. Under these circumstances, a reduction in the heat capacity of the plate of the heating apparatus is sought for.

The present invention has been made in view of the problems described above, and has as its object to provide a heating apparatus that can realize a large area in order to improve the thermal processing precision of the object to be heated without increasing the weight and heat capacity per unit area of the heating plate.

It is another object of the present invention to provide a heating apparatus and method in which unwanted thermal deformation of the object to be heated can be uppressed so that the thermal processing precision is improved, the apparent heat capacity is decreased to shorten the preheat time required before the start of heating, and the power consumption of the heating apparatus can be decreased.

It is still another object of the present invention to provide a heating apparatus in which heaters are located at desired regions so, even if the area of the plate is further increased, any temperature distribution can be reduced.

In order to achieve the above objects, according to the present invention, there is provided a heating apparatus characterized by having a heating member obtained by stacking at least first and second plates to heat a plate-like object to be heated, and a heater serving as a heat source of the heating member, the first plate having a larger thermal conductivity than the second plate and the second plate having smaller creep than the first plate.

In order to solve the above problems and to achieve the above objects, according to the present invention, there is provided a heating apparatus for placing a flat plate-like object to be heated on a support surface and heating the object to be heated with heating means from a support surface side, characterized in that the heating means comprises a heating member that forms the support surface by stacking first and second plates, and a heater provided to the heating member as a heat source, the first plate being made of a metal material having a larger thermal conductivity than the second plate, and the second plate being made of a metal material having smaller creep as change amount caused by heat than the first plate.

Preferably, there is provided a heating apparatus for placing a flat plate-like object to be heated on a support surface and heating the object to be heated with heating means from a support surface side, characterized in that the heating means comprises a heating member obtained by stacking a second plate that forms the support surface, a first plate, and an auxiliary plate to sandwich the first plate, and a plurality of rod heaters detachably provided as a heat source in holes formed in the first plate, the first plate being made of a metal material having a larger thermal conductivity than the second plate and the auxiliary plate, and the second plate and the auxiliary plate being made of a metal material having smaller creep as change amount caused by heat than the first plate.

Preferably, there is also provided a heating apparatus for placing a flat plate-like object to be heated on a support surface and heating the object to be heated with heating means from a support surface side, characterized in that the heating means comprises a heating member that forms the support surface, and a plurality of rod heaters provided as a heat source in the heating member, and that the apparatus further comprises a plurality of support members for heating the heating means on a base member and arranged to be movable with respect to the base member, and temperature control means for performing separate temperature control operation for the support members to maintain parallelism of the heating means.

Preferably, there is provided a method of heating a flat plate-like member to be heated, characterized in that the member to be heated is placed on a flat plate, the flat plate is supported by a plurality of support members, a temperature state of the support members upon heating operation of the flat plate is measured, a temperature of the support members is controlled on the basis of measured information to guarantee a given flatness of the flat plate with the support members, thereby heating the member to be heated on the flat plate.

Preferably, there is provided a heating apparatus characterized in that, in order to integrate first and second glass plates through a frame provided at edge portions thereof and to fix a spacer member on the first glass plate at a predetermined position in a space of the frame with low-melting glass in advance, heating operation is performed by heating means formed by stacking a first plate provided with a heater and a second plate.

There is also provided a heating apparatus for placing a flat plate-like object to be heated on a support surface and heating the object to be heated with heating means from a support surface side, characterized in that the heating means comprises a heating member obtained by stacking a second plate that forms the support surface, a first plate, and an auxiliary plate to sandwich the first plate, and a plurality of rod heaters detachably provided as a heat source in holes formed in the first plate, the first plate being made of a metal material having a larger thermal conductivity than the second plate and the auxiliary plate, and the second plate and the auxiliary plate being made of a metal material having smaller creep as change amount caused by heat than the first plate, and that the apparatus further comprises a flow path formed in the second plate or the auxiliary plate to pass a coolant therethrough.

With the above arrangement, the first plate having a larger thermal conductivity than the second plate and the second plate having smaller creep than the first plate are stacked, so that any warp of the first plate resulting from heat of the heaters is suppressed by the second plate having smaller creep, and the object to be heated is heated by the first plate having a larger thermal conductivity without producing temperature nonuniformity in its heated surface. As compared to a heating apparatus using only the second plate having a smaller thermal conductivity, since the first plate having a larger thermal conductivity is used, the apparent heat capacity decreases, and the preheat time until the start of the thermal process can be shortened.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 34A to 34C are views explaining the manufacturing process of a display, in which FIG. 34A shows a state after manufacture, FIG. 34B shows a state before manufacture, and FIG. 34C shows a state during the manufacture;

DETAILED DESCRIPTION OF THE PREFERRED EMBODIMENTS

The preferred embodiments of the present invention will be described with reference to the accompanying drawings.

Figure 1:
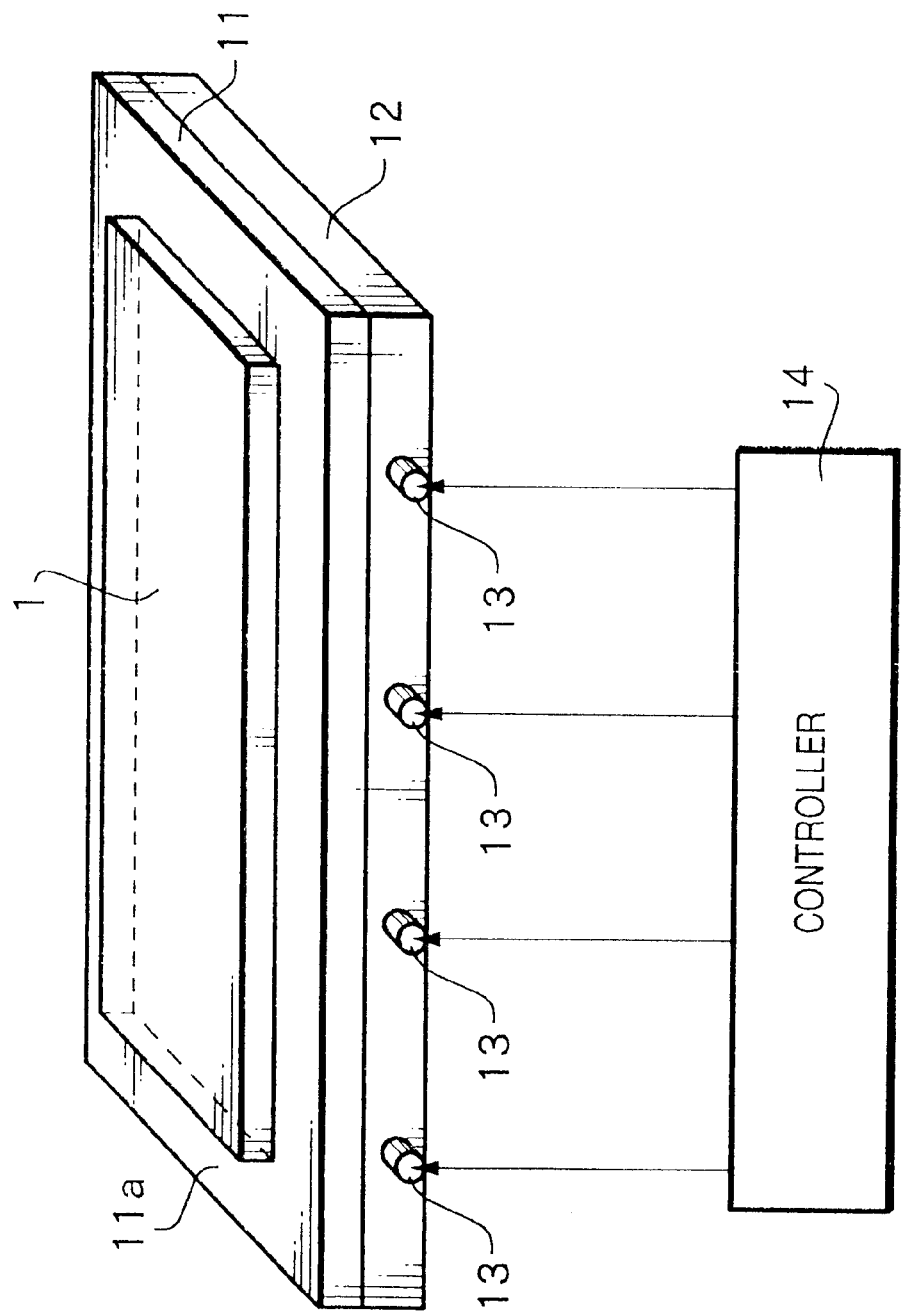
FIG. 1 is a view explaining a heating apparatus according to the first embodiment of the present invention.

FIG. 1 is a view explaining a heating apparatus according to the first embodiment of the present invention.

The heating apparatus of this embodiment is formed by stacking a base plate 11 on a heat transfer plate 12 in which rod heaters 13 controlled by a controller 14 are inserted, and heats an object 1 to be heated placed on the base plate 11.

The base plate 11 is made of stainless steel or the like having smaller creep than the heat transfer plate 12. The base plate 11 is fixed with a support member (not shown). The heat transfer plate 12 is made of aluminum or the like having a larger thermal conductivity than the base plate 11. The heat value of the rod heaters 13 is controlled by the controller 14 on the basis of a signal from at least one temperature sensor (not shown) placed on the base plate 11 or heat transfer plate 12. The object 1 to be heated is placed on a heating surface 11a of the base plate.

The heat transfer process from the rod heaters 13 to the object 1 to be heated will be described. The controller 14 controls the rod heaters 13 to generate heat on the basis of the signal from the temperature sensor. Heat generated by the rod heaters 13 is radiated toward the heat transfer plate 12, diffuses in the heat transfer plate 12, and is transferred to the object 1 to be heated through the base plate 11.

Figure 37:
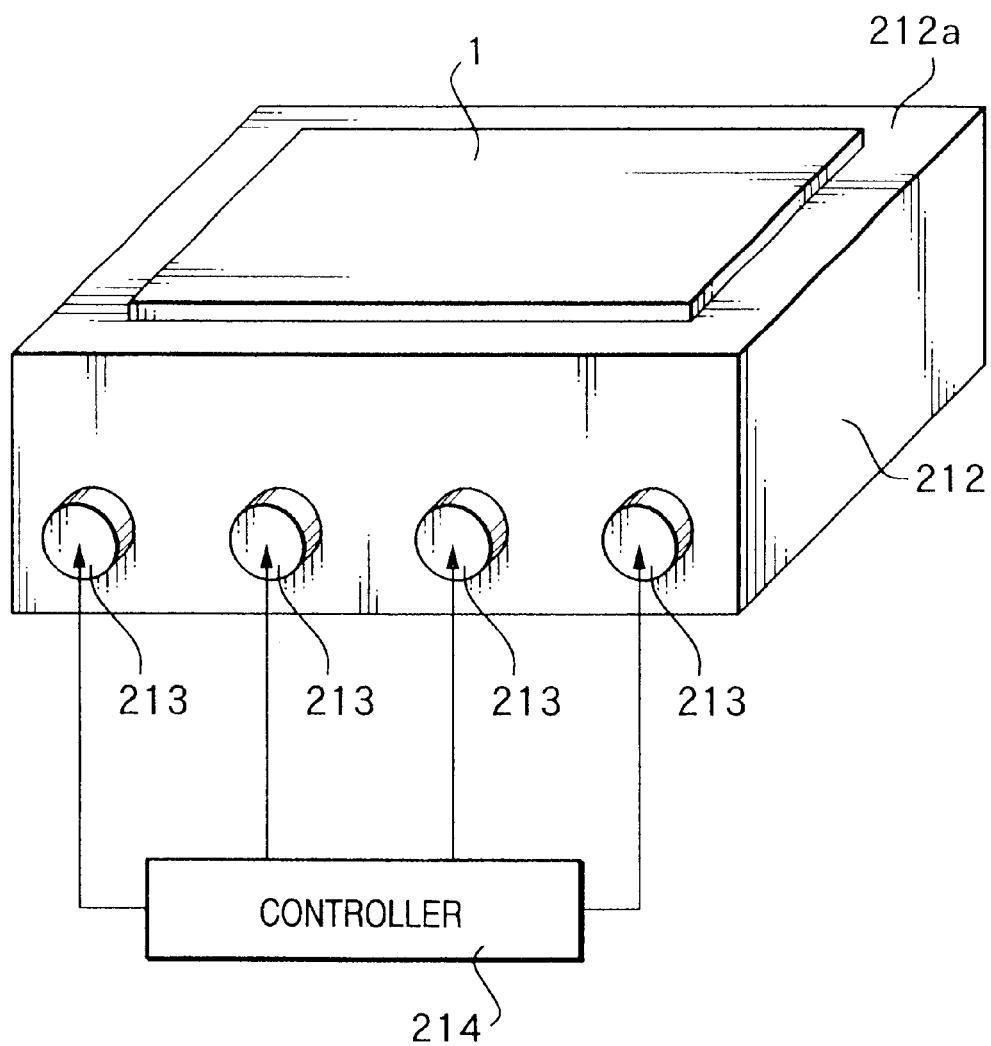
FIG. 37 is a view showing the arrangement of a conventional heating apparatus.

In this manner, since the heat conducting rate is higher in the heat transfer plate 12 than in the base plate 11, heat is transferred to the heat transfer plate 12 immediately, and temperature nonuniformity within that surface of the heat transfer plate 12 which is in contact with the base plate 11 decreases. In this state, heat is transferred to the base plate 11 in the direction of plate thickness to heat the object 1 to be heated placed on the base plate 11. This state is identical to a state wherein a small flat heater having a small in-plane temperature nonuniformity is in contact with the base plate 11. As compared to a case wherein the rod heaters 213 are placed in the single-layered plate 212 made of stainless steel having a low heat conductivity with gaps between them, as in the conventional case shown in FIG. 37, the temperature gradient in the base plate 11 decreases. Accordingly, temperature nonuniformity within that surface of the base plate 11 which is in contact with the object 1 to be heated also decreases, and the temperature of the object 1 to be heated can be increased while maintaining small temperature distribution within its surface in contact with the base plate 11.

Since warp of the heat transfer plate 12 is suppressed by the base plate 11 having smaller creep, deformation of that surface of the heat transfer plate 12 which is in contact with the object 1 to be heated can be decreased than in a case wherein only the heat transfer plate 12 is used.

A material having smaller creep and used to form the base plate 11 generally has alarge heat capacity. Since part of the plate of the heating apparatus is formed of the heat transfer plate 12 having a smaller heat capacity, the apparent heat capacity of the plate as a whole of the heating apparatus can be suppressed.

In this manner, when thermal deformation of the base plate 11 is minimized, unwanted thermal deformation of the object 1 to be heated can be minimized. Since the apparent heat capacity of the plate as a whole is small, power consumption required for heating is suppressed, thus achieving power conservation.

Figure 2:
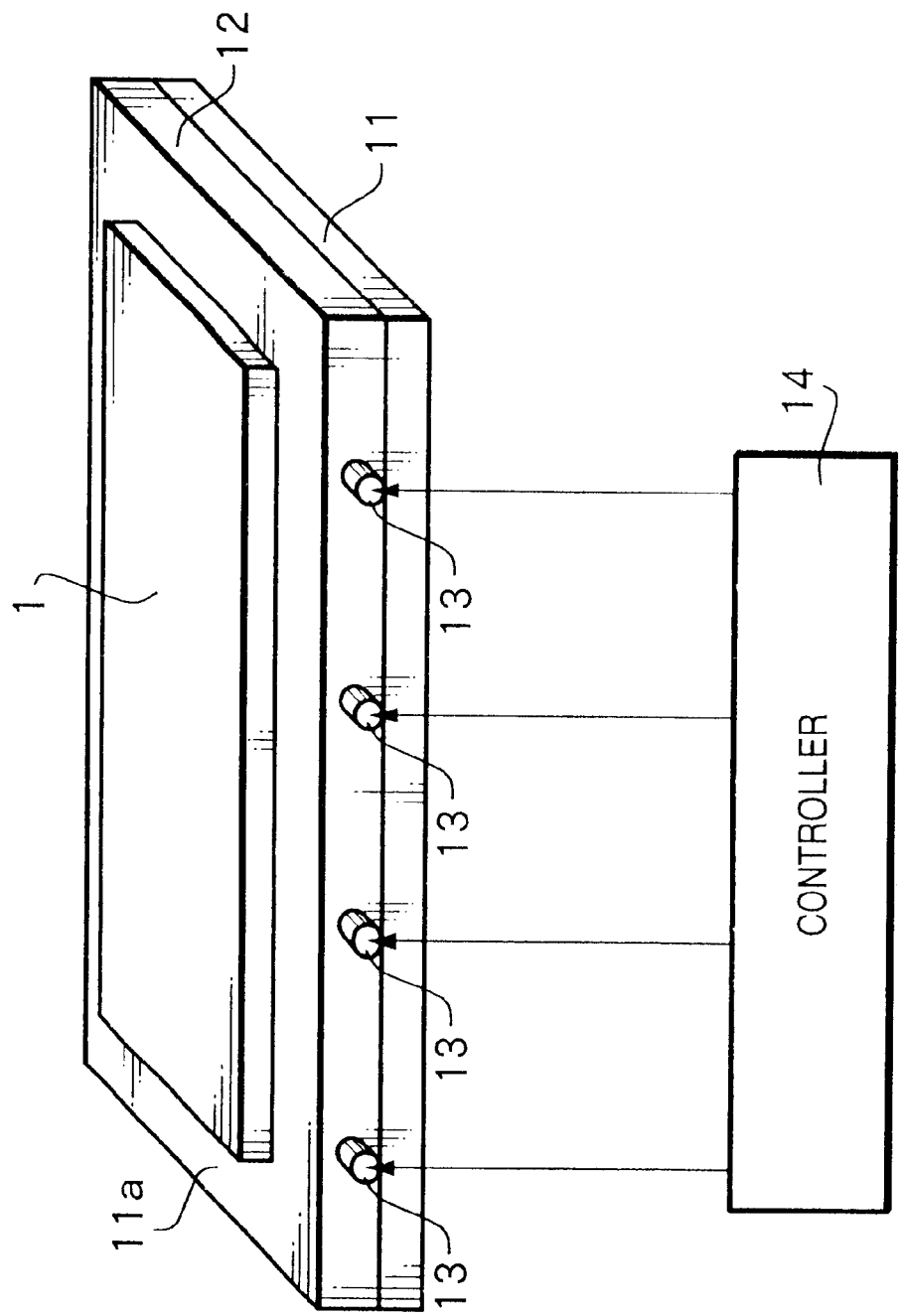
FIG. 2 is a view explaining a heating apparatus according to the second embodiment of the present invention.

FIG. 2 is a view explaining a heating apparatus according to the second embodiment of the present invention.

In the second embodiment, a heat transfer plate 12 in which rod heaters 13 are inserted directly heats an object 1 to be heated, and a base plate 11 is placed on the lower surface of the heat transfer plate 12, as shown in FIG. 2, i.e., the base plate 11 and heat transfer plate 12 are stacked in the reverse order. The second embodiment is different from the first embodiment described above in this respect.

Other than that, the second embodiment is similar to the first embodiment in, e.g., the materials of the base plate 11 and heat transfer plate 12, the fact that the heat value of the rod heaters 13 is controlled by a controller 14 on the basis of a signal from at least one temperature sensor (not shown) provided to the base plate 11 or heat transfer plate 12, and the like.

The heat transfer process from the rod heaters 13 to the object 1 to be heated in this embodiment will be described.

Heat radiated from the rod heaters 13 in response to an instruction from the controller 14 diffuses in the heat transfer plate 12. Since the heat transfer plate 12 has a large thermal conductivity, temperature nonuniformity of that surface of the heat transfer plate 12 which is in contact with the object 1 to be heated decreases. Accordingly, the temperature of the object 1 to be heated climbs up while its in-plane nonuniformity is maintained small.

The base plate 11 stacked on the heat transfer plate 12 is made of a material having smaller thermal deformation, e.g., creep, than the heat transfer plate 12. Hence, thermal deformation of the heat transfer plate 12 is suppressed more than a case wherein only the heat transfer plate 12 is used, so thermal deformation of that surface of the heat transfer plate 12 which is in contact with the object 1 to be heated can be decreased.

In the second embodiment, unlike in the first embodiment, the heat transfer plate 12 into which the rod heaters 13 are inserted directly heats the object 1 to be heated. The time required for heating is accordingly shortened, and the apparent heat capacity of the plate as a whole is further decreased than in the first embodiment.

In the above manner, when thermal deformation of the heat transfer plate 12 is minimized, unwanted thermal deformation of the object 1 to be heated can be minimized. Since the apparent heat capacity of the plate as a whole is small, power consumption required for heating is suppressed, thus achieving power conservation.

Figure 3:
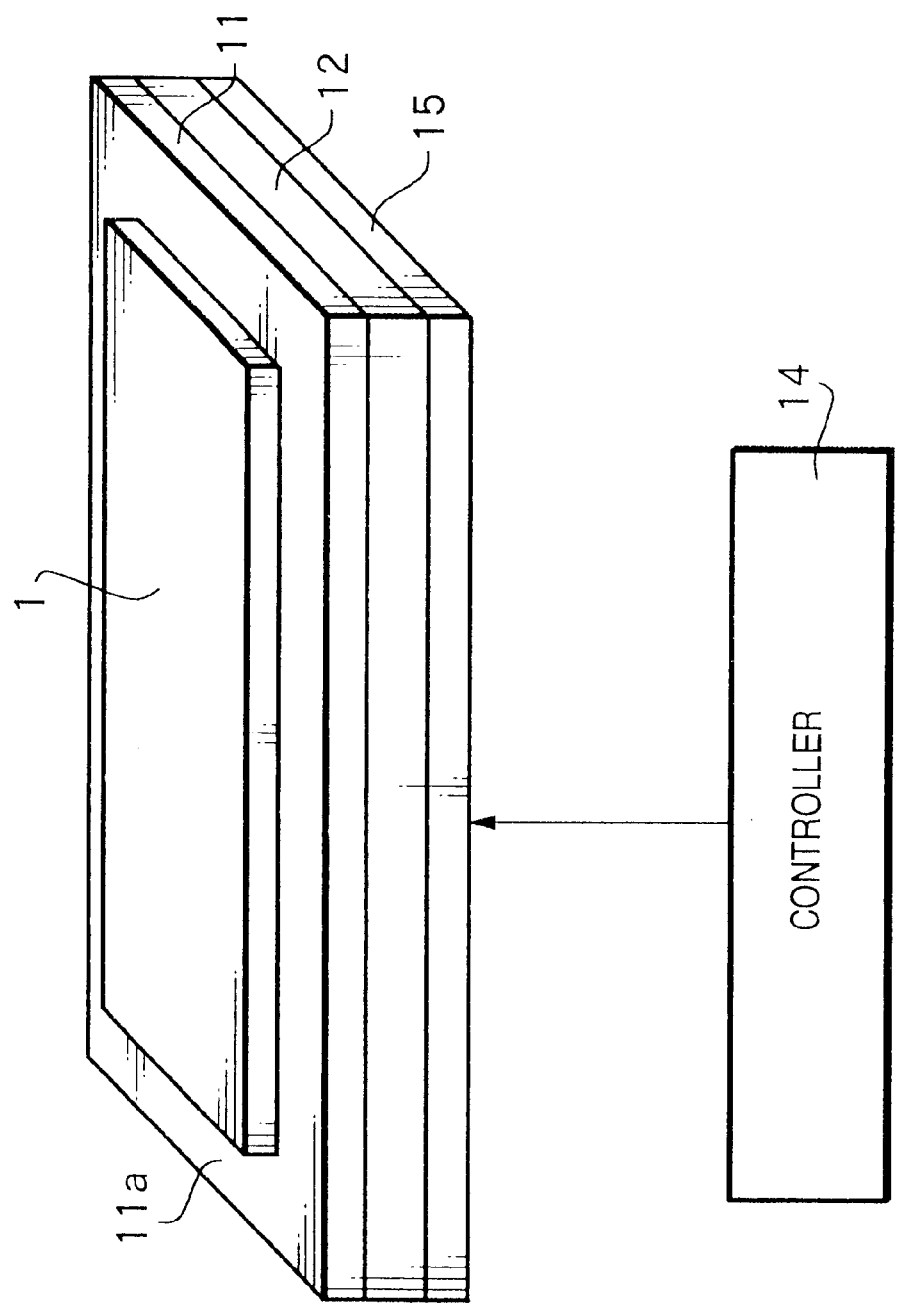
FIG. 3 is a view explaining a heating apparatus according to the third embodiment of the present invention.

FIG. 3 is a view explaining a heating apparatus according to the third embodiment of the present invention. In the first embodiment, the rod heaters 13 are inserted in the heat transfer plate 12. In the third embodiment, a flat heater 15 is placed on the lower surface of a heat transfer plate 12, as shown in FIG. 3. The third embodiment is different from the first embodiment in this respect. Other than that, the third embodiment is similar to he first embodiment in, e.g., the materials of a base plate 11 and the heat transfer plate 12, the fact that the heat value of the flat heater 15 is controlled by a controller 14 on the basis of a signal from at least one temperature sensor (not shown) provided to the base plate 11 or heat transfer plate 12, and the like.

In the third embodiment, in addition to the effect of the first embodiment, due to the presence of the flat heater 15, temperature nonuniformity within a surface in contact with the base plate 11 can be decreased more than in the first embodiment using the rod heaters 13.

Figure 4:
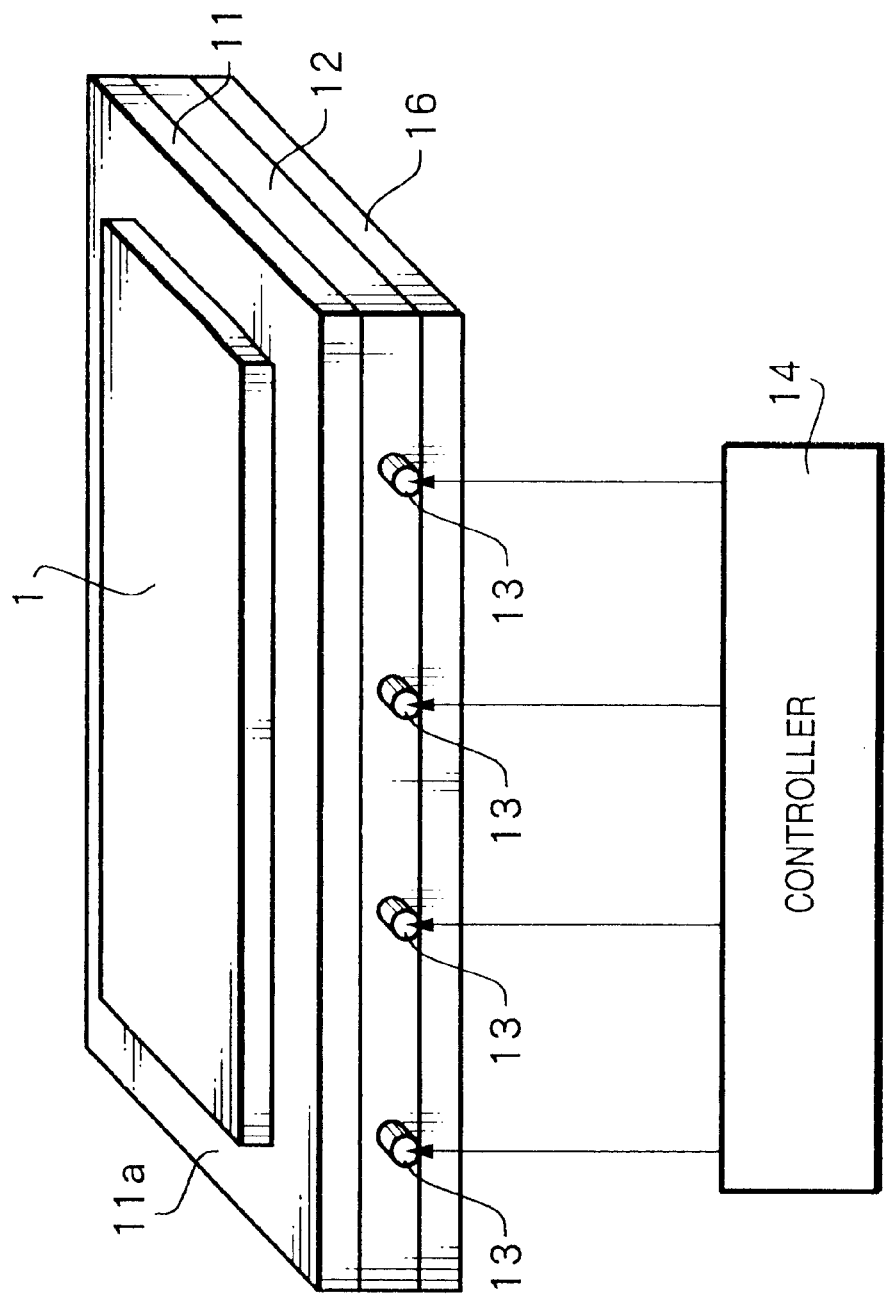
FIG. 4 is a view explaining a heating apparatus according to the fourth embodiment of the present invention.

FIG. 4 is a view explaining a heating apparatus according to the fourth embodiment of the present invention.

In the fourth embodiment, an auxiliary plate 16 is placed on the lower surface of a heat transfer plate 12. The fourth embodiment is different from the first embodiment in this respect. The auxiliary plate 16 is made of a material having a thermal conductivity and creep closer to those of a base plate 11 than those of the heat transfer plate 12. The auxiliary plate 16 may be made of the same material as that of the base plate 11.

Other than that, the fourth embodiment is similar to the first embodiment in, e.g., the materials of the base plate 11 and heat transfer plate 12, the fact that the heat value of rod heaters 13 is controlled by a controller 14 on the basis of a signal from at least one temperature sensor (not shown) provided to the base plate 11 or heat transfer plate 12, and the like.

In the fourth embodiment, in addition to the effect of the first embodiment, even if the amount of expansion of the base plate 11 and that of the heat transfer plate 12 are different from each other due to a difference in coefficient of thermal expansion between the base plate 11 and heat transfer plate 12, as the amount of expansion of the base plate 11 and that of the auxiliary plate 16 are close or equal to each other, warp deformation by the bimetal effect can be minimized. Since deformation of that surface of the heating apparatus which is in contact with an object 1 to be heated is reduced, any gap between the heat transfer plate 12 of the heating apparatus and the object 1 to be heated, that forms if any warp were present is reduced. As a result, nonuniformity in heat transfer amount depending on the location of a heating surface ha decreases to prevent an increase in in-plane temperature nonuniformity of the object 1 to be heated. Thermal deformation of the heat transfer plate 12 is prevented from being transferred to the object 1 to be heated. Hence, degradation of the shape precision of the object 1 to be heated can be minimized.

Figure 5:
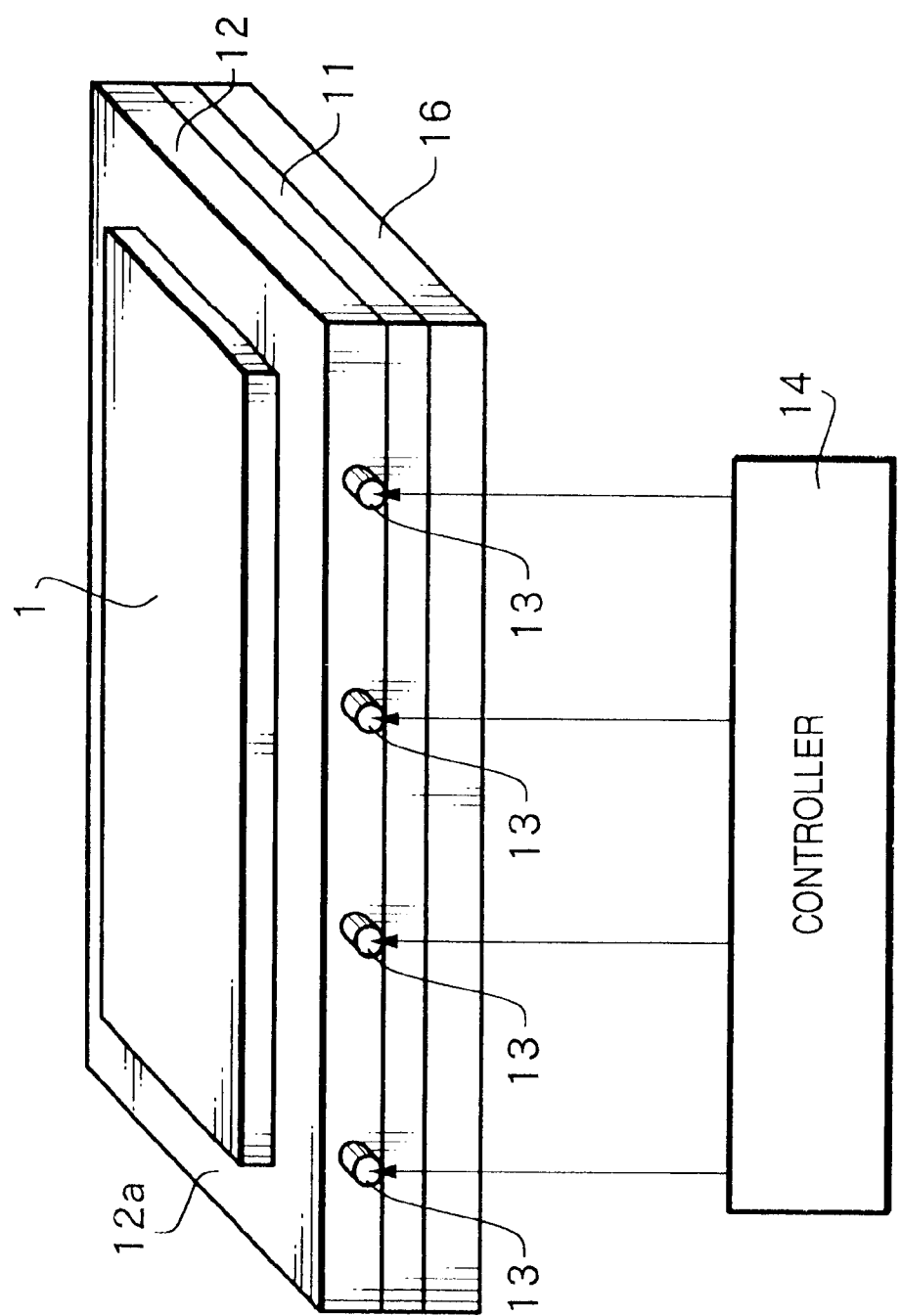
FIG. 5 is a view explaining a heating apparatus according to the fifth embodiment of the present invention.

FIG. 5 is a view explaining a heating apparatus according to the fifth embodiment of the present invention.

The fifth embodiment is different from the second embodiment in that an auxiliary plate 16 is placed on the lower surface of a heat transfer plate 12. In the fourth embodiment as the material of the auxiliary plate 16, one having a thermal conductivity and creep closer to those of the material of the base plate 11 is used. In contrast to this, in the fifth embodiment, as the material of the auxiliary plate 16, one having a thermal conductivity and creep closer to those of the material of the heat transfer plate 12 than those of the material of a base plate 11 is used. The auxiliary plate 16 may be made of the same material as that of the heat transfer plate 12.

Other than that, the fifth embodiment is similar to the second embodiment in, e.g., the materials of the base plate 11 and heat transfer plate 12, the fact that the heat value of rod heaters 13 is controlled by a controller 14 on the basis of a signal from at least one temperature sensor (not shown) provided to the base plate 11 or heat transfer plate 12, and the like.

In the fifth embodiment, in addition to the effect of the second embodiment, even if the amount of expansion of the base plate 11 and that of the heat transfer plate 12 are different from each other due to a difference in coefficient of thermal expansion between the base plate 11 and heat transfer plate 12, as the amount of expansion of the heat transfer plate 12 and that of the auxiliary plate 16 are close or equal to each other, warp deformation by the bimetal effect can be minimized. Since deformation of that surface of the heating apparatus which is in contact with an object 1 to be heated is reduced, any gap between the heat transfer plate 12 of the heating apparatus and the object 1 to be heated, that forms in the presence of warp is reduced. As a result, nonuniformity in heat transfer amount depending on the location of a heating surface 12a decreases to prevent an increase in in-plane temperature nonuniformity of the object 1 to be heated. Thermal deformation of the heat transfer plate 12 is prevented from being transferred to the object 1 to be heated. Consequently, degradation of the shape precision of the object 1 to be heated can be minimized.

Figure 6:
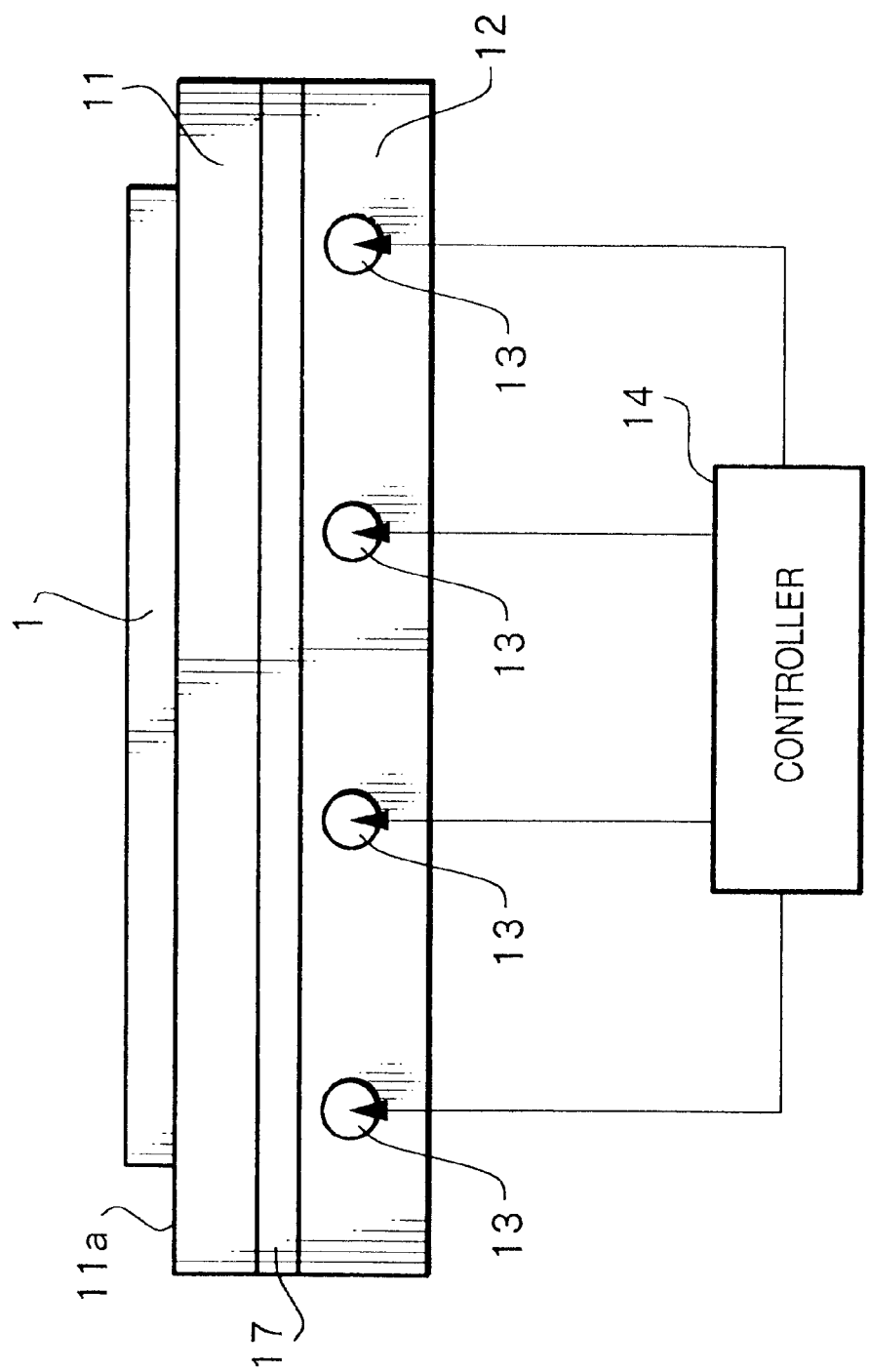
FIG. 6 is a view explaining a heating apparatus according to the sixth embodiment of the present invention.

FIG. 6 is a view explaining a heating apparatus according to the sixth embodiment of the present invention.

In the first embodiment, the base plate 11 and heat transfer plate 12 are merely stacked to form an air layer between them. In contrast to this, in the sixth embodiment, a filler having a larger thermal conductivity than that of air is filled between a base plate 11 and a heat transfer plate 12. The sixth embodiment is different from the first embodiment in this respect.

Other than that, the sixth embodiment is similar to the first embodiment in, e.g., the materials of the base plate 11 and heat transfer plate 12, the fact that the heat value of rod heaters 13 is controlled by a controller 14 on the basis of a signal from at least one temperature sensor (not shown) provided to the base plate 11 or heat transfer plate 12, and the like.

In the sixth embodiment, in addition to the effect of the first embodiment, the heat transfer rate from the heat transfer plate 12 to the heat transfer plate 12 becomes faster due to the presence of the filler 17 filled between the base plate 11 and heat transfer plate 12. This increases the heating rate of an object 1 to be heated. Since the heat transfer rate increases, temperature differences between the heat transfer surfaces decrease.

Since the plate surface is not an ideal flat surface, a portion where the heat transfer plate 12 and base plate 11 contact each other and a portion where they do not contact each other but form an air layer are present on the plate surface. Even if temperature nonuniformity is small in the heat transfer surface of the heat transfer plate 12, the heat transfer rate is low where an air layer is present and is fast where it is not present, producing a temperature nonuniformity in the heat transfer surface of the base plate 11.

In the sixth embodiment, this air layer is filled with the filler 17 having a larger thermal conductivity than that of air to eliminate any difference in heat transfer rate depending on location. As a result, temperature nonuniformity in the heat transfer surface of the base plate 11 is decreased. In this manner, even if the flatness of the contact surface of the plate is not increased up to such a level that the plates completely contact each other, the adhesion can be increased to reduce any temperature distribution, so that the load on the process is reduced.

In the fourth or fifth embodiment, if a filler 17 is filled between the heat transfer plate 12 and auxiliary plate 16 and between the base plate 11 and auxiliary plate 16, the same effect as that described above can be obtained.

Figure 7:
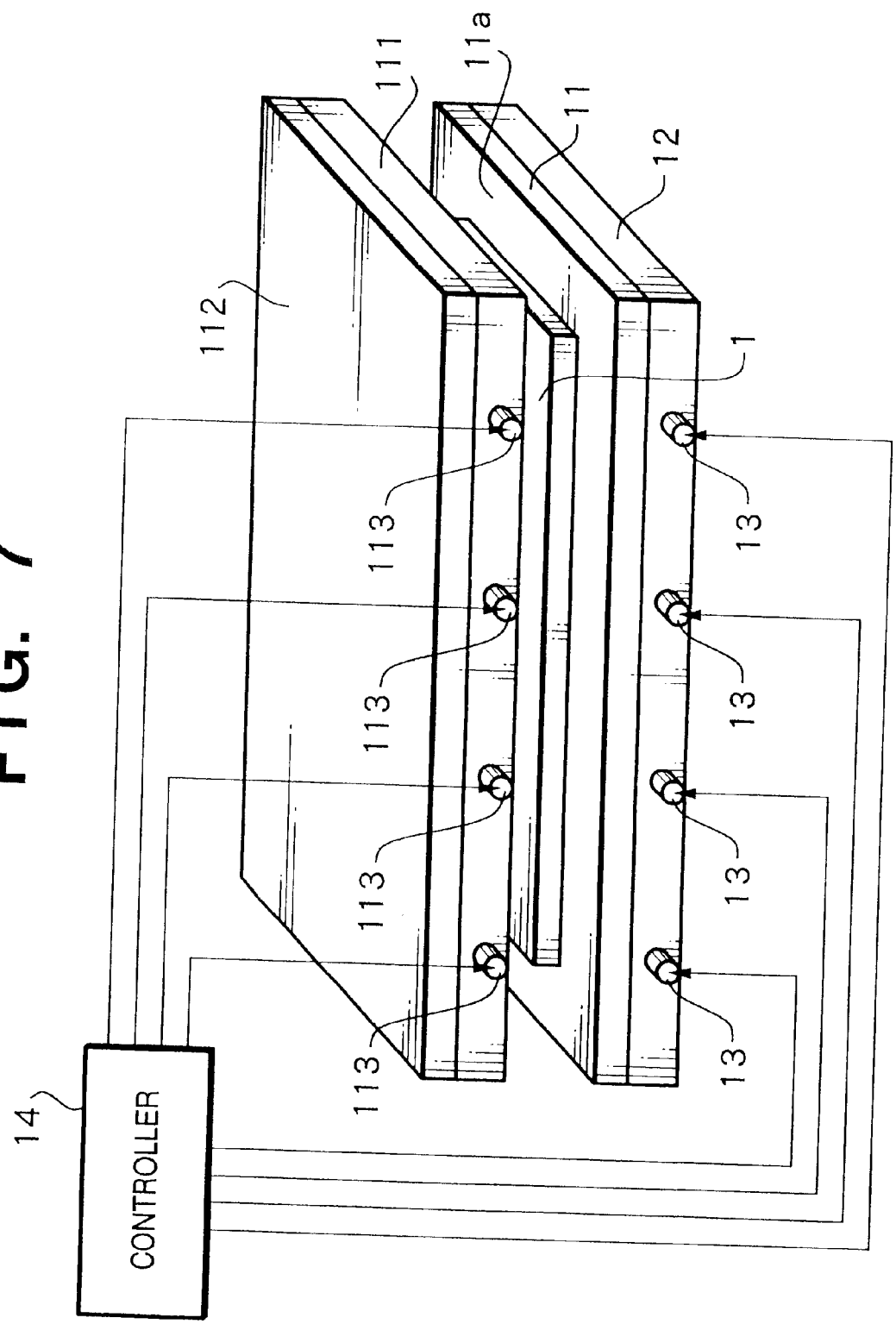
FIG. 7 is a view explaining the heating apparatus of the present invention.

FIG. 7 is a view explaining a heating apparatus according to the seventh embodiment of the present invention.

In the seventh embodiment, above a heating apparatus having the same arrangement as that of the first embodiment, another heating apparatus having the same arrangement as that of the first embodiment is disposed to face it, so that base plates 11 and 111 sandwich an object 1 to be heated from its two surface sides. Note that the upper base plate 111 is not in contact with the object 1 to be heated.

Other than that, the basic arrangement of the sixth embodiment is similar to that of the first embodiment in, e.g., the materials of the base plates 11 and 111 and heat transfer plates 12 and 112, the fact that the heat value of rod heaters 13 and 113 is controlled by a controller 14 on the basis of a signal from at least one temperature sensor (not shown) provided to the base plates 11 and 111 or heat transfer plates 12 and 112, and the like.

In the seventh embodiment, in addition to the effect of the first embodiment, since the base plates 11 and 111 heat the object 1 to be heated by sandwiching it from its two surface sides, the heating rate can be increased. Since the amount of heat radiated from the open surface of the object 1 to be heated in the first embodiment, i.e., from a surface of the object 1 to be heated which is not set on the heating apparatus, is eliminated, the flow of heat from the lower rod heaters 13 in FIG. 7 toward the object 1 to be heated decreases by an amount of heat almost equal to this amount of radiated heat. Although this flow of heat varies since the contact state of the plates differs depending on the location, the amounts of these variations also decrease relatively. As a result, in-plane temperature nonuniformity of the object 1 to be heated can also be decreased.

Although the object 1 to be heated is not in contact with the upper base plate 111 in this embodiment, it may be in contact with the upper base plate 111. In this case, the heat transfer efficiency to the object 1 to be heated increases.

ACTUAL EXAMPLES

The actual examples of the above first to fourth embodiments will be described.

First Actual Example

The first actual example that practices the first embodiment of the present invention will be described with reference to FIG. 1.

A stainless steel plate having a thickness of 10 mm or 5 mm was used as the base plate 11 of the heating apparatus, and an aluminum alloy plate having a thickness of 10 mm was used as the heat transfer plate 12, thereby constituting the heating apparatus.

An in-plane temperature distribution was ±3° C. or less when the temperature of that surface of the object 1 to be heated which was in contact with the base plate was near 200° C., and it was ±5° C. or less when the surface temperature was near 400° C. When the object 1 to be heated was a glass plate, the in-plane positional precision of glass was also suppressed to ±10 μm. When the object 1 to be heated was subjected to a heat cycle of 400° C. or more, warp of that surface of the object 1 to be heated which was in contact with the base plate was 0.23 mm or less per 400 mm. Also, the cooling and heating times were shortened (Second embodiment).

The second actual example that practices the fourth embodiment of the present invention will be described with reference to FIG. 4.

Stainless steel plates having a thickness of 10 mm or 5 mm were used as the base plate 11 and auxiliary plate 16 of the heating apparatus, and an aluminum alloy plate having a thickness of 10 mm was used as the heat transfer plate 12, thereby constituting the heating apparatus.

An in-plane temperature distribution was ±3° C. or less when the temperature of that surface of the object 1 to be heated which was in contact with the base plate was near 200° C., and it was ±5° C. or less when the surface temperature was near 400° C. When the object 1 to be heated was a glass plate, the in-plane positional precision of glass was also suppressed to ±10 μm. When the object 1 to be heated was subjected to a heat cycle of 400° C. or more, warp of that surface of the object 1 to be heated which was in contact with the base plate was 0.18 mm or less per 400 mm. Also, the cooling and heating times were shortened. In the heating apparatus described above, base plates 11 and 111 as the second plate having smaller creep than heat transfer plates 12 and 112 as the first plate are stacked, so that warp of the first plate caused by heat of the heaters 13 is suppressed by the second plate having smaller creep, and the object to be heated can be heated by the first plate having a larger thermal conductivity without any temperature non-uniformity in its heated surface. Hence, unwanted thermal deformation of the object to be heated is suppressed, thus improving the thermal processing precision. As compared to a heating apparatus using only the second plate having a smaller thermal conductivity, since the first plate having a larger thermal conductivity is stacked, the apparent heat capacity decreases, and the preheat time until the start of the thermal process can be shortened. This decreases the power consumption of the heating apparatus.

Figure 8:
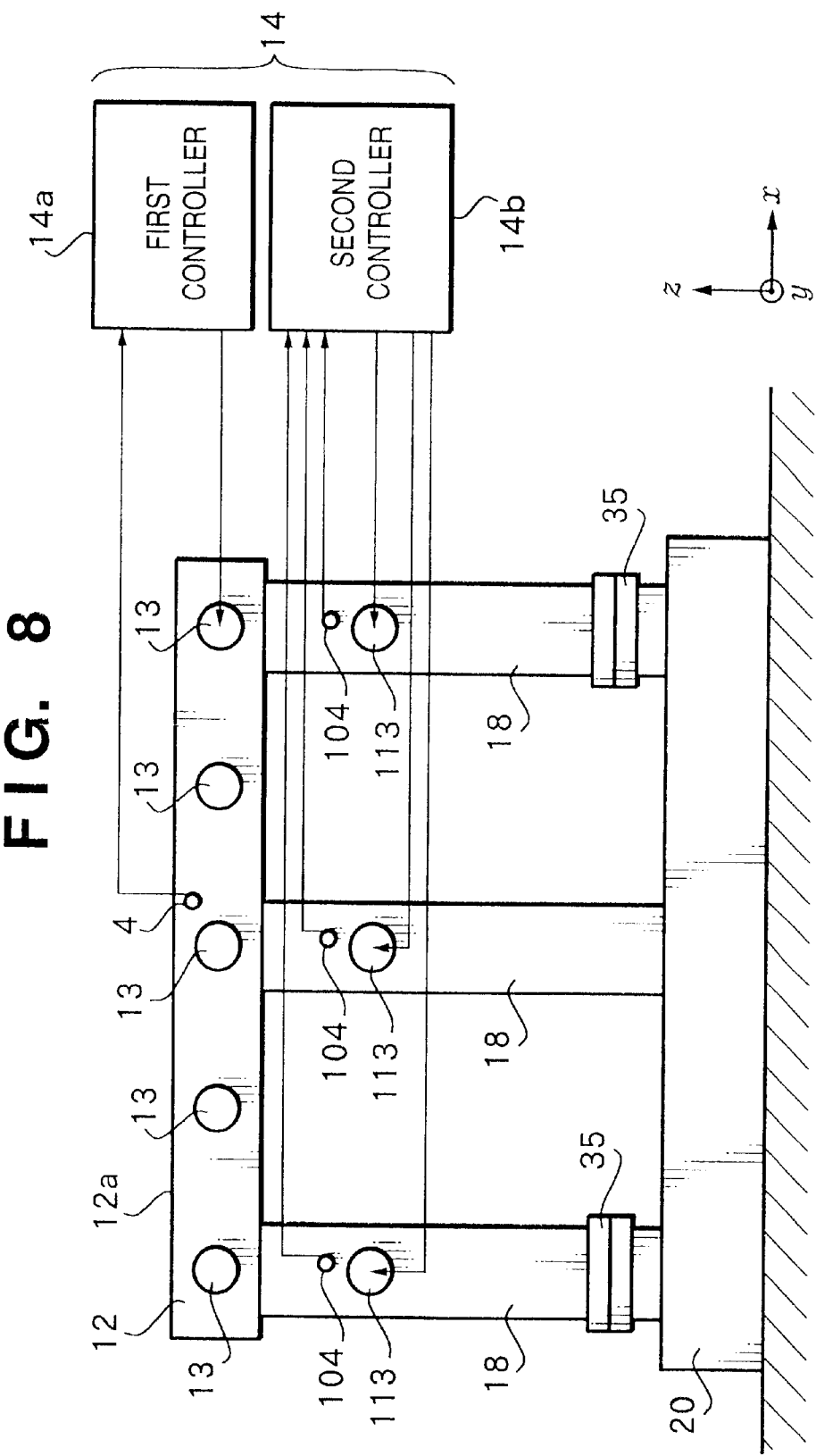
FIG. 8 is a view showing the arrangement of a heating apparatus according to the seventh embodiment of the present invention.

FIG. 8 shows the seventh embodiment of the present invention. In FIG. 8, the building components identical to those that have already been described are denoted by the same reference numerals, and a repetitive explanation will be omitted. A heat transfer plate 12 for heating is made of stainless steel. The plate 12 has a length of 500 mm, a width of 500 mm, and a thickness of 20 mm.

An upper surface 12a of the plate 12 serves as a support surface where a member to be heated (not shown) is to be placed, and is accordingly finished to have a surface roughness of 10 μm or less at maximum. The plate 12 incorporates heaters 13 as heating means at predetermined gaps from each other, as shown in FIG. 8, and heats the heat transfer plate 12 upon energization of the heaters 13.

A temperature sensor 4 is mounted in the heat transfer plate 12. The heaters 13 and sensor 4 are connected to a first controller 14a. Energization signals from the first controller 14a control energization to the respective heaters 13. A temperature signal from the sensor 4 is sent to the first controller 14a.

The heat transfer plate 12 is supported by support members 18 made of stainless steel to support it at a predetermined distance from a base member 20. For this purpose, five support members 18 are arranged at, i.e., the four corners and central portion of the heat transfer plate 12.

The base member 20 is made of stainless steel or an aluminum material.

The support member 18 at the central portion forms a rectangular parallelepiped shape. The upper end of this support member 18 is fixed to the lower surface of the central portion of the heat transfer plate 12, and a lower end thereof is fixed to the upper surface of the base member 20.

Figure 9:
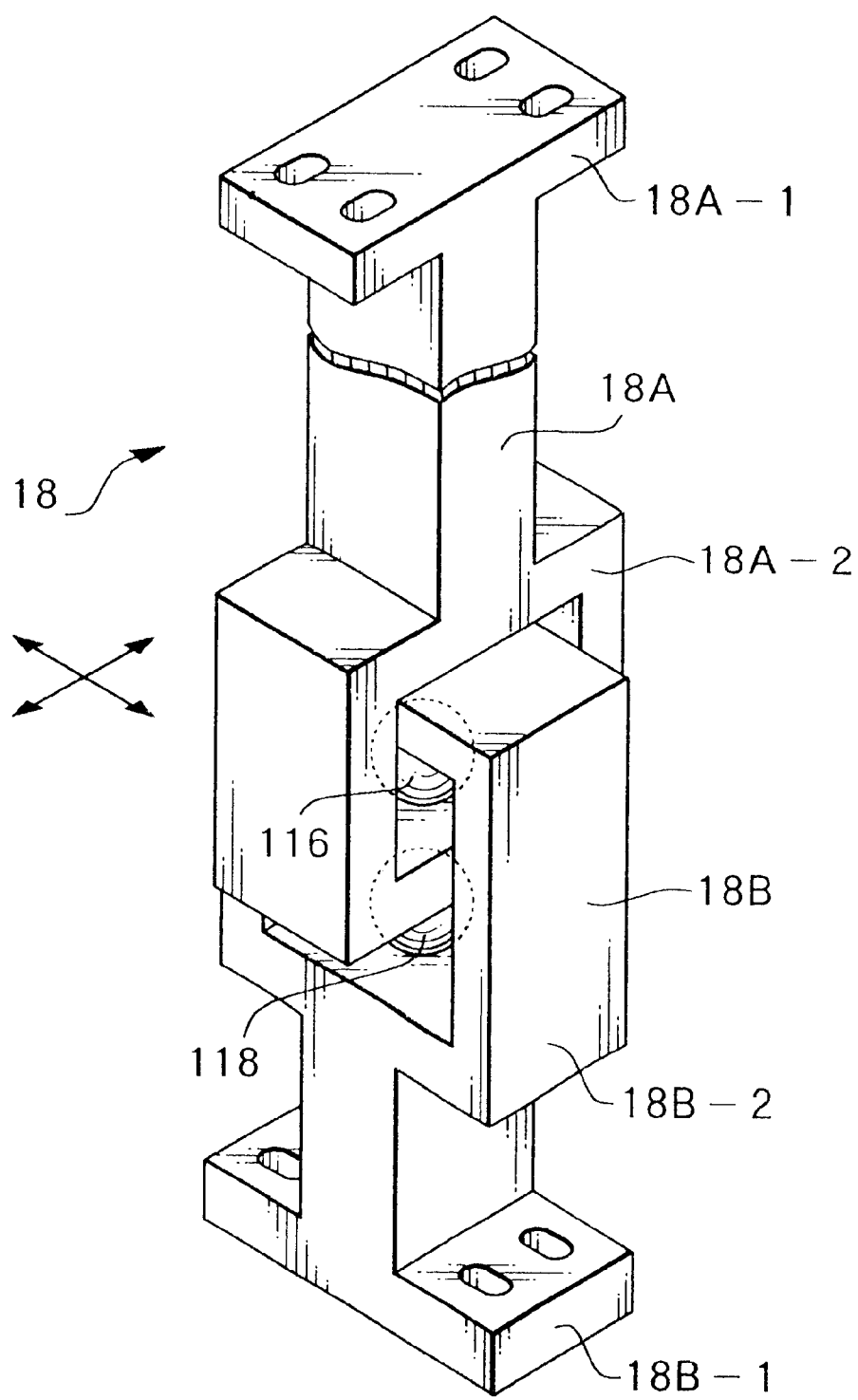
FIG. 9 is a view explaining the main part of a moving unit having chain connection.
Figure 10:
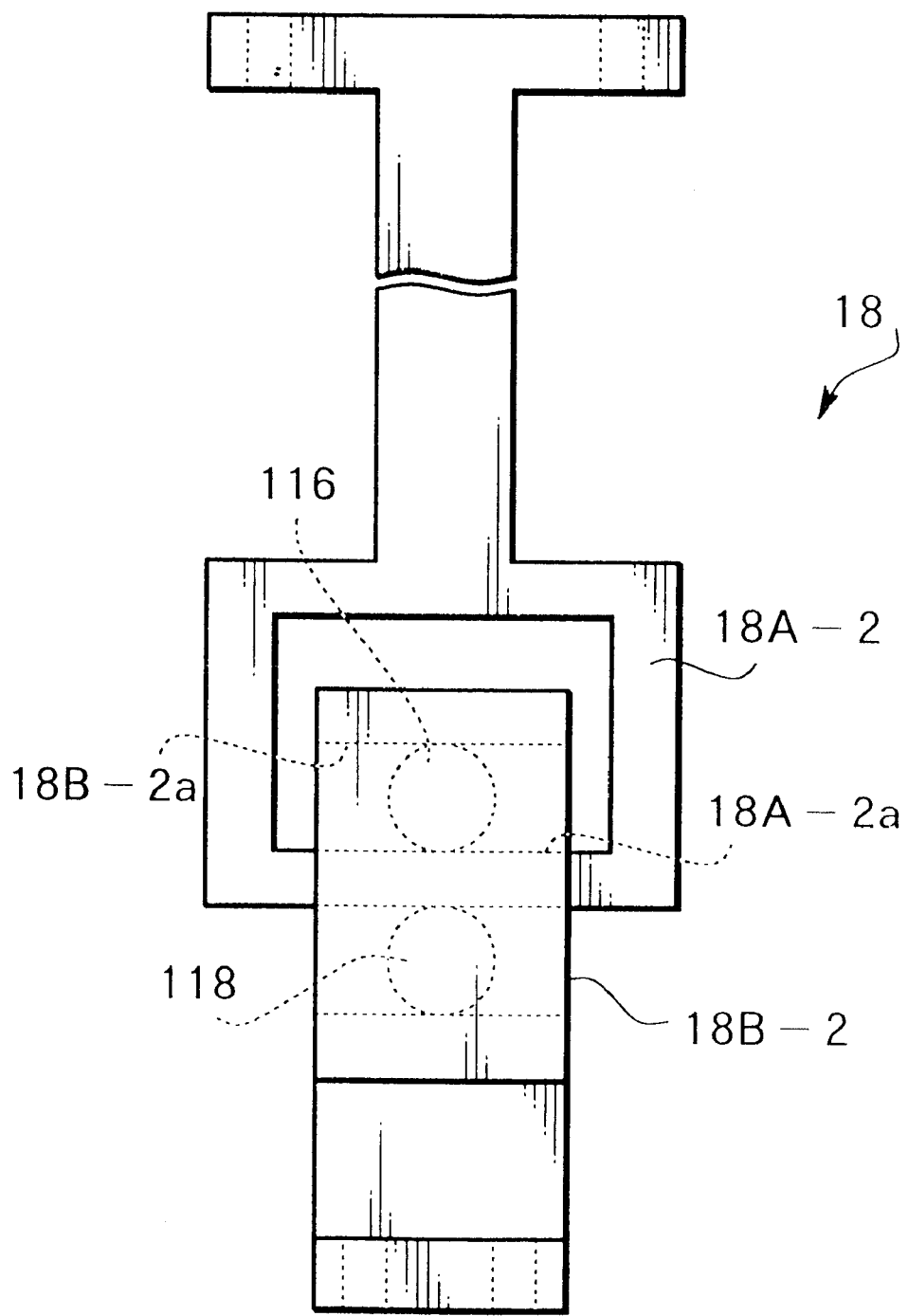
FIG. 10 is a view explaining the moving unit.

The support members 18 at the two sides are constructed as shown in FIGS. 9 and 10.

Referring to FIGS. 9 and 10, the support member 18 is constituted by first and second members 18A and 18B. An upper end portion 18A-1 of the member 18A forms a flange to be fixed to the lower surface of the heat transfer plate 12, and a lower end portion thereof forms a first ring portion 18A-2.

A lower end portion 18B-1 of the member 18B forms a flange to be fixed to the upper surface of the base member 20, and an upper end portion thereof forms a second ring portion 18B-2.

The ring portion 18B-2 forms a ring shape by combining U-shaped members.

The respective ring portions 18A-2 and 18B-2 are connected like a chain, as shown in FIGS. 9 and 10. Rotary balls 116 and 118 formed of steel or ceramic balls are interposed between the opposing positions of an inner surface 18A-2a of the first ring portion 18A-2 and an outer surface 18B-2a of the second ring portion 18B-2, such that movements of the inner and outer surfaces 18A-2a and 18B-2a between the first and second members 18A and 18B within a plane in directions indicated by arrows is permitted.

Figure 11:
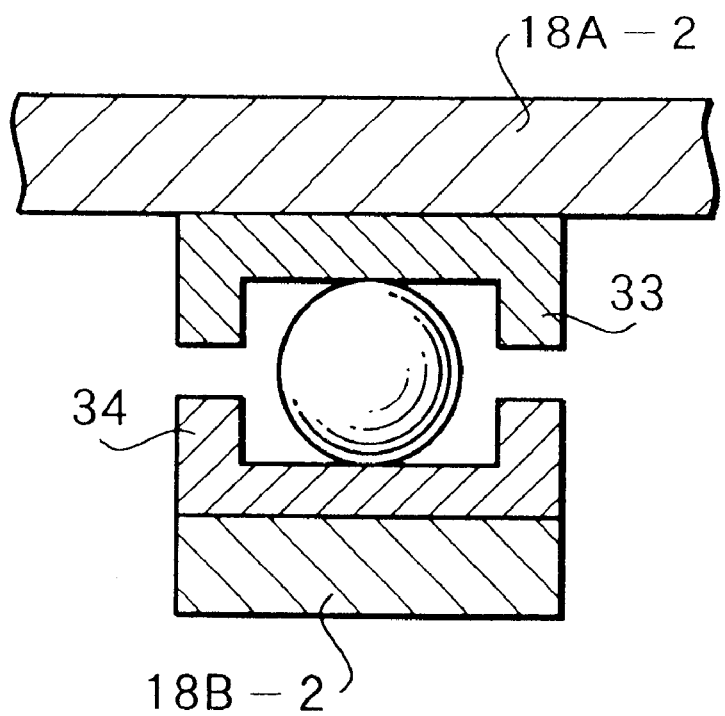
FIG. 11 is a view explaining the arrangement of the main part of the moving unit.

As shown in FIG. 11, the ball 116 or 118 is supported by seats 33 and 34.

The support members 18 that are disposed to oppose each other have the same arrangement as that described above.

The heater 113 as a heating means is attached to each support member 18. A temperature sensor 104 is attached to each support member 18 as shown in FIG. 8.

The respective heaters 113 and sensors 104 are connected to a second controller 14b. Energization signals from the second controller 14b energize the respective heaters 113 to heat the respective support members 18. Temperature information on the respective support members 18 obtained by the sensors 104 is transmitted to the second controller 14b.

Referring to FIG. 8, the support members 18 on the two ends have chained portions 35, respectively. These chained portions 35 are provided at positions closer to the base member 20.

The operation and function of the seventh embodiment described above will be described.

The heaters 13 are separately energized by the signals from the first controller 14a of the heating apparatus to heat the heat transfer plate 12.

The temperature of the heat transfer plate 12 is controlled within a predetermined temperature range by the sensor 4 and heaters 13 while the member to be processed (not shown) placed on the upper surface of the heat transfer plate 12 is processed.

As the heat transfer plate 12 and the member to be processed are heated, the temperatures of the respective support members 18 also rise.

Figure 12:
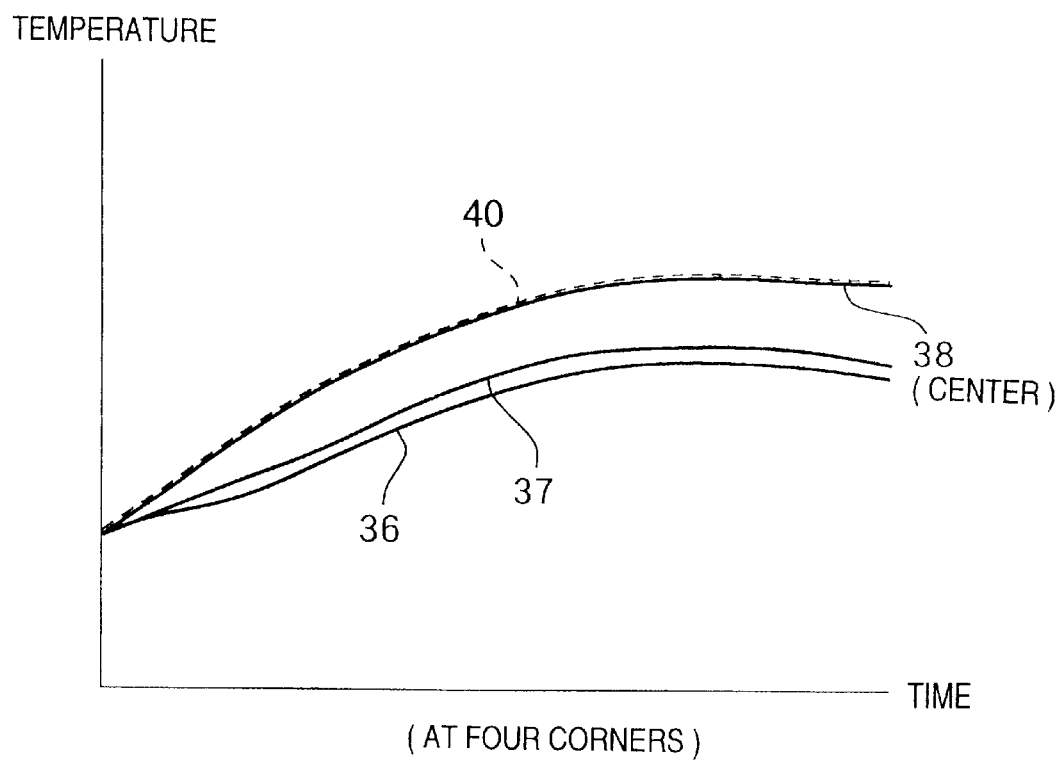
FIG. 12 is a graph of temperature curves.

FIG. 12 is a graph of temperature change curves of the support members 18. The support members 18 at the four corners show almost uniform upward temperature changes 36 and 37, while the support member 18 located at the central portion is affected most by heat transfer from the heating flat plate to show a largest upward temperature change 38. The temperature sensors 104 attached to the respective support members measure the temperatures of the respective support members and transmit these data to the second controller 14b.

In response to signals from the sensors 104, the second controller 14b energizes the heaters 113 attached to the support members 18 to increase the temperatures of the support members 18, thereby performing temperature adjustment 40 to match expansion of the central support member 18 in response to its temperature change 38. As a result, the support members as a whole maintain uniform distance between the heat transfer plate 12 and base member 20 to suppress deflection or the like of the heat transfer plate 12. In response to the signals from the sensors attached to the support members, the second controller 14b controls energization to the respective heaters such that temperature changes of the support members fall within an allowable flatness range of the flat plate, and performs adjustment such that a change in expansion of the respective support members falls within a predetermined range. Since motion of the support members 18 in directions X–Y shown in FIG. 8 is permitted by employing the mechanism shown in FIGS. 9 and 10, the load of deformation in the z direction is reduced, and high flatness of the flat plate is maintained.

Figure 13:
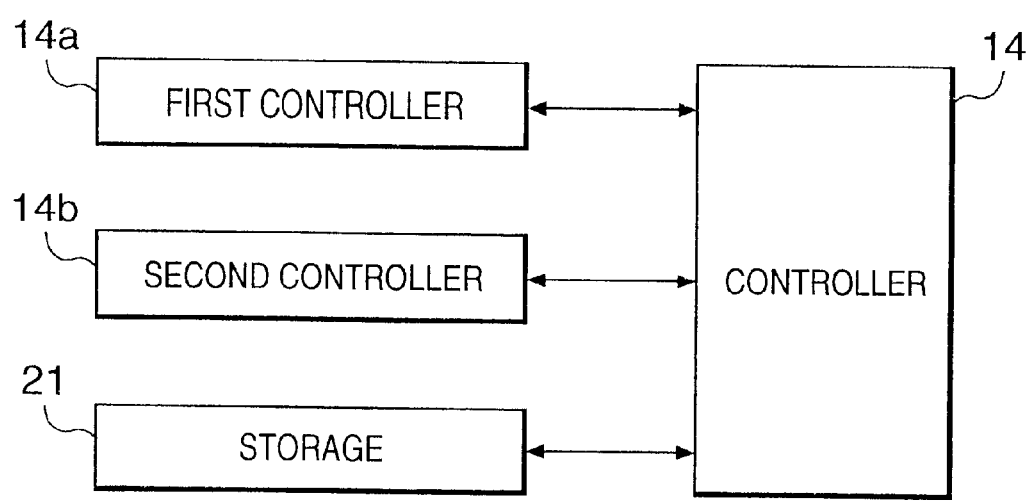
FIG. 13 is a diagram explaining a control block.

FIG. 13 is a block diagram showing how to control the temperatures of the respective support members of this embodiment, in which controllers 14a and 14b have the same function as the temperature controlling means.

A storage 21 stores the temperature change curve of the support member, among the respective support members 18 of the apparatus having the arrangement of FIG. 8, which has a largest upward temperature change at the processing temperature of the heat transfer plate 12. The storage 21 is controlled by the controller 14 that entirely controls the respective controllers 14a and 14b.

The temperatures of the respective support members 18 are input to the controller 14 through the controller 14b as information from the temperature sensors 104 attached to the support members 18 in accordance with the progress of the heating process of the heat transfer plate 12.

The controller 14 compares the temperatures of the respective support members 18 with the information stored in the storage 21. When the temperatures of the support members 18 fall within a predetermined range of the temperature information stored in the storage 21, the heaters of the support members 18 are energized, and expansion of the support members 18 is controlled.

Temperature control of the support members 18 is managed through energization control of the heaters in accordance with temperature data measured in advance.

Figure 14:
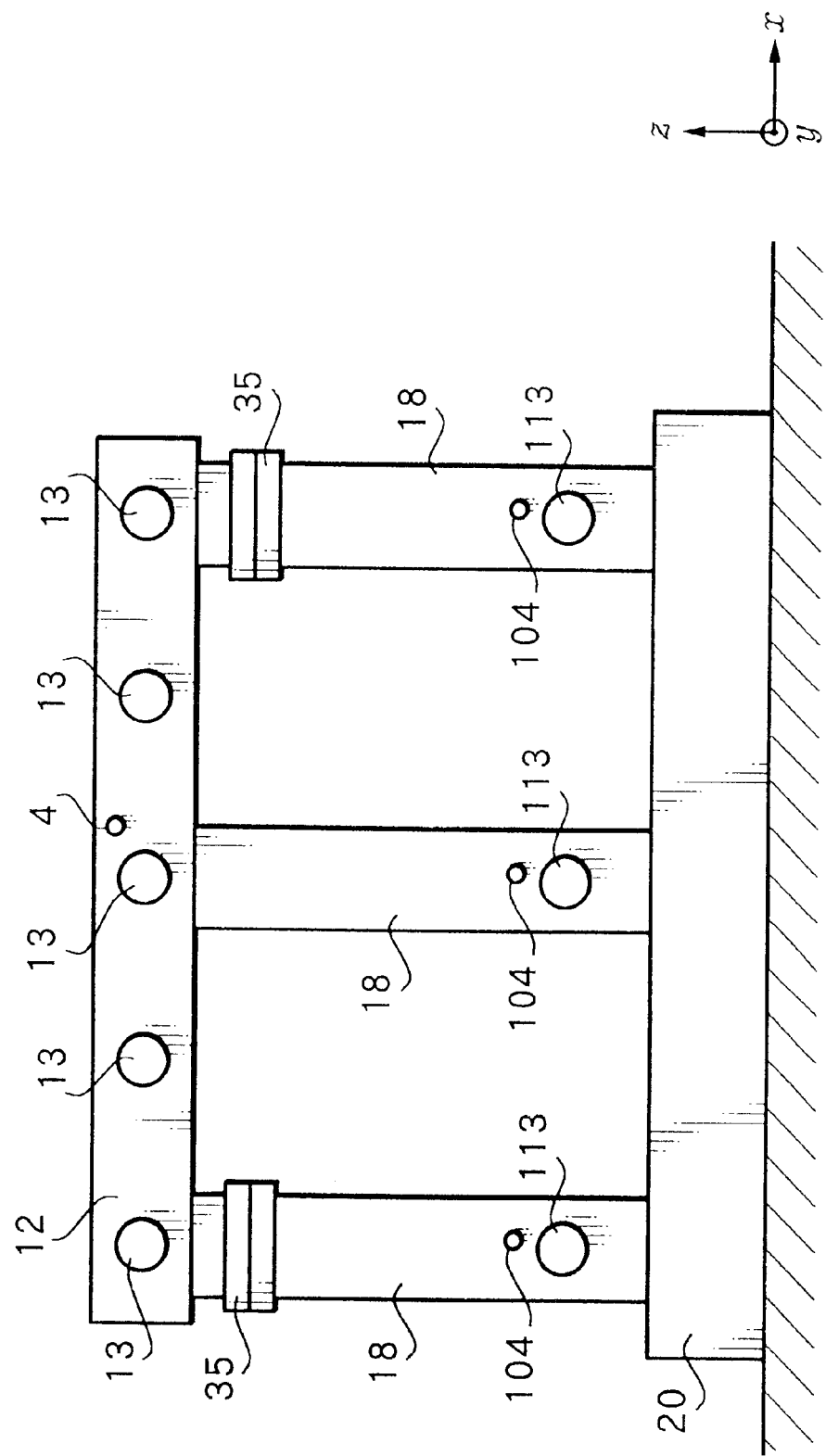
FIG. 14 is a view explaining a heating apparatus having another arrangement.

FIG. 14 shows a case wherein the positions of the moving units 35 attached to the support members 18 are changed.

Figure 15:
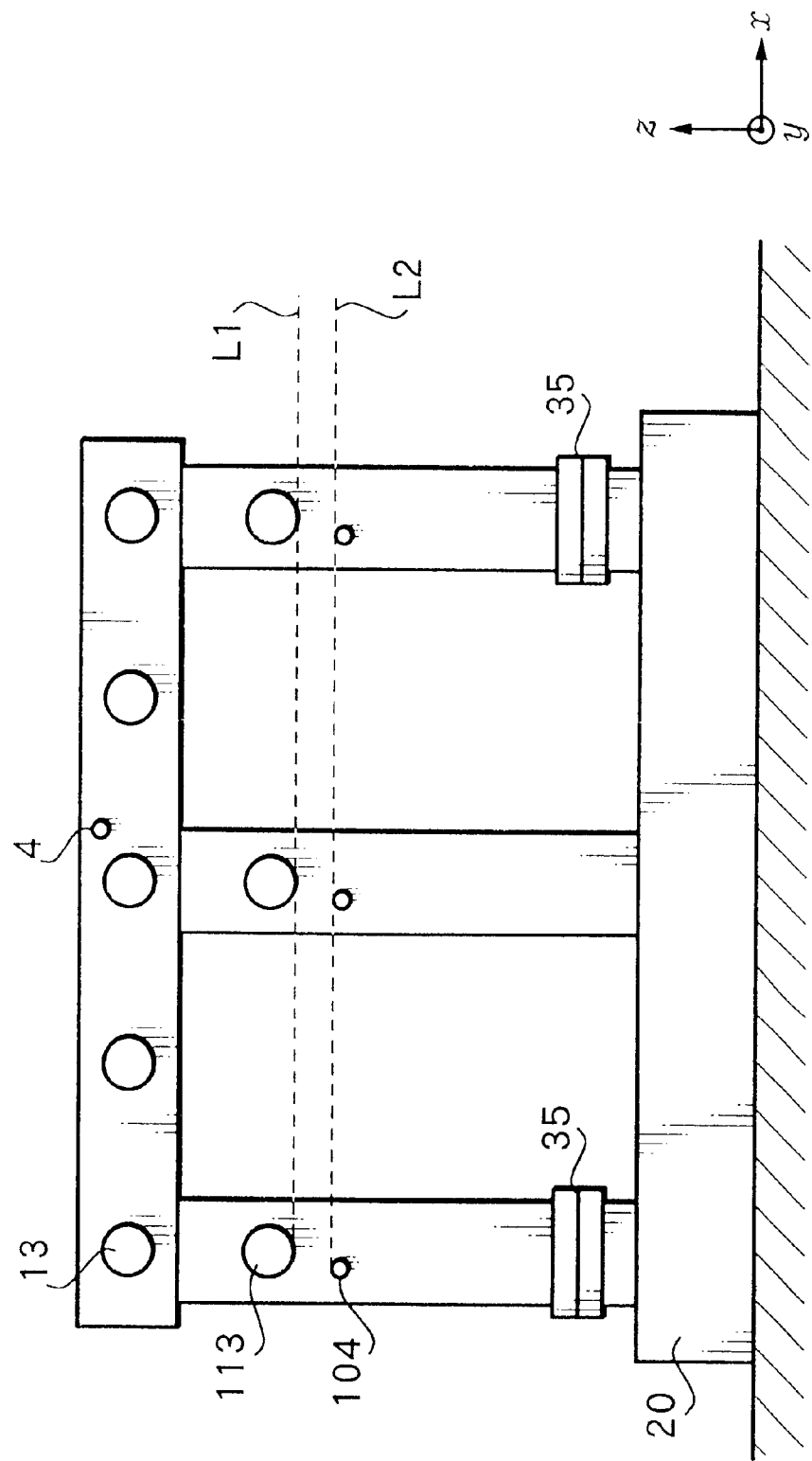
FIG. 15 is a view explaining a heating apparatus having still another arrangement.

In the case of FIG. 15, moving units 35 are located at positions close to a base member 20, and heaters and sensors are located at positions close to the flat plate. In this case, high flatness of the heating plate can be maintained without applying a thermal load to the moving units 35.

In the case of the arrangement of FIG. 14, since the respective support members do not move with temperature increase of the heating plate, peripheral members of the system/apparatus, i.e., a reflector, a cylinder, a suction pipe, and the like can be set on each support member.

In FIG. 15, the arrangement of the apparatus is identical to that of FIG. 8. Referring to FIG. 15, heaters for heating the respective support members are mounted closer to the flat plate than the sensors, and the heaters and sensors of the respective support members are mounted at equal positions of L1 and L2, respectively, from the lower surface of the flat plate.

Figure 16:
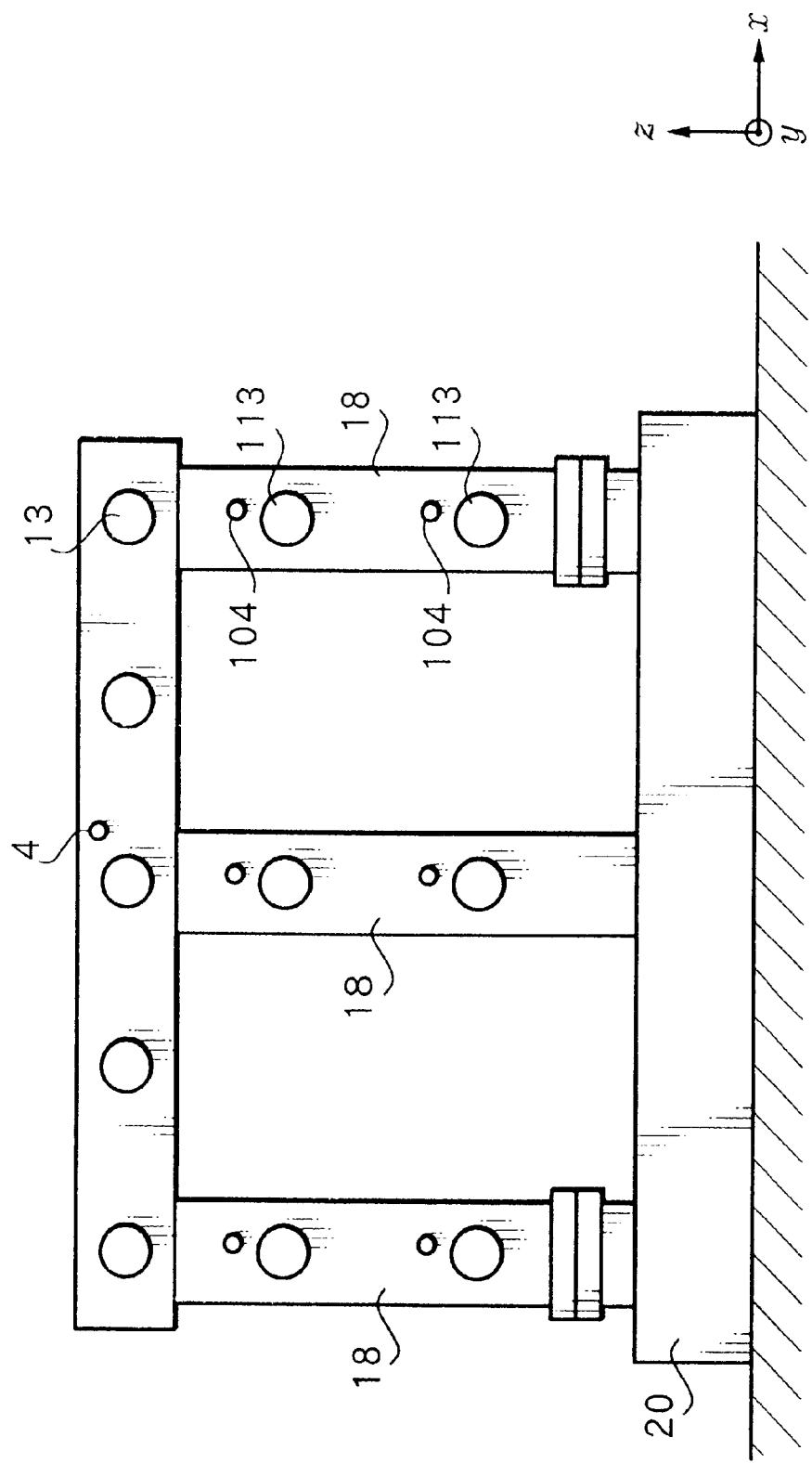
FIG. 16 is a view explaining a heating apparatus having still another arrangement.

FIG. 16 shows a case wherein sensors and heaters are arranged at the upper and lower ends of the respective support members to improve the temperature detection performance of the respective members and to control uniform expansion of the respective support members.

In the case of FIG. 16, temperature information from the two sensors mounted on the respective support members are input to a controller. Accordingly, expansion of the respective support members can be accurately detected from a change in temperature of the two sensors, and the flat plate can be set parallel more accurately.

Figure 17:
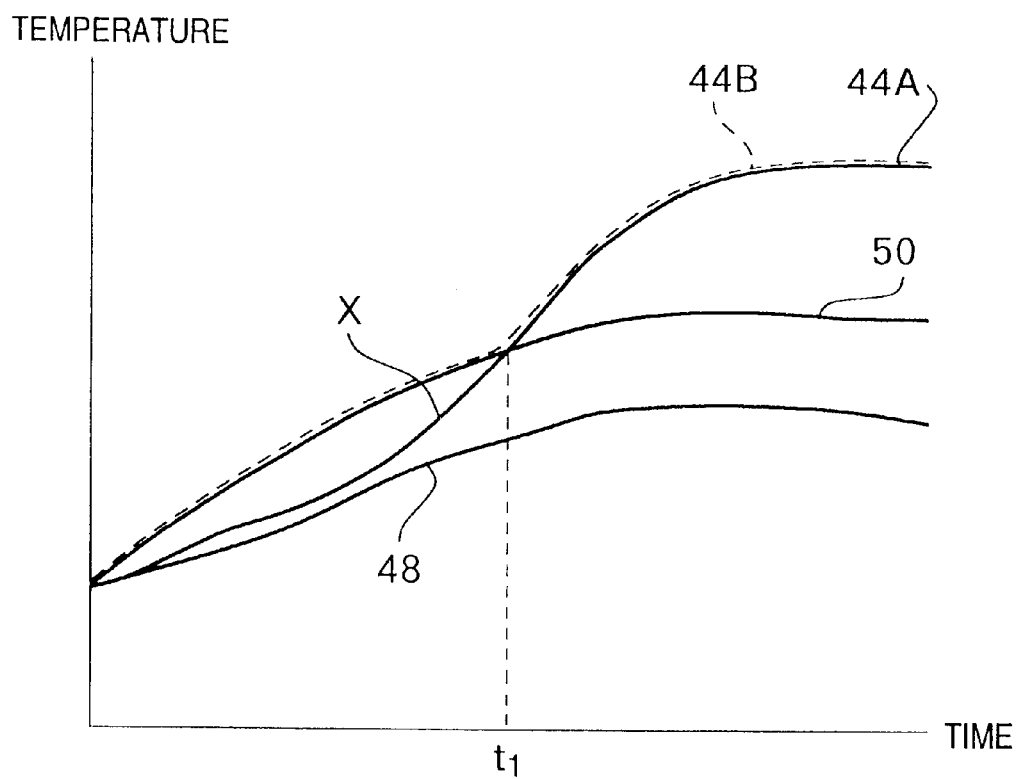
FIG. 17 is a graph of temperature curves.

FIG. 17 shows a case wherein expansion of the respective support members that depends on the temperature history of the support member 18 at the center in FIG. 8 is controlled.

Referring to FIG. 8, attaching members for the heater and sensor, attaching members for the moving mechanism K described above, and other members (not shown) are attached to each support member. The temperature increase history curves of the support members do not sometimes form simple quadratic curves, and the heat capacities of the respective support members also differ. For example, the temperature curve of the central support member sometimes shows a sharp temperature increase a certain period of time after the apparatus is operated, as indicated by reference numerals 44A and 44B in FIG. 17. The temperature increase curves of other support members form stable rising curves as indicated by reference numerals 48 and 50.

In this case, the temperature history curves as the curves 44A and 44B are stored in the storage 21. The lapse time after the apparatus is operated is measured. When the lapse time reaches a point of inflection, the temperatures of other support members are increased so as to follow the temperature curve 44. When temperature control is performed in this manner, parallelism of the flat plate is guaranteed.

Figure 18:
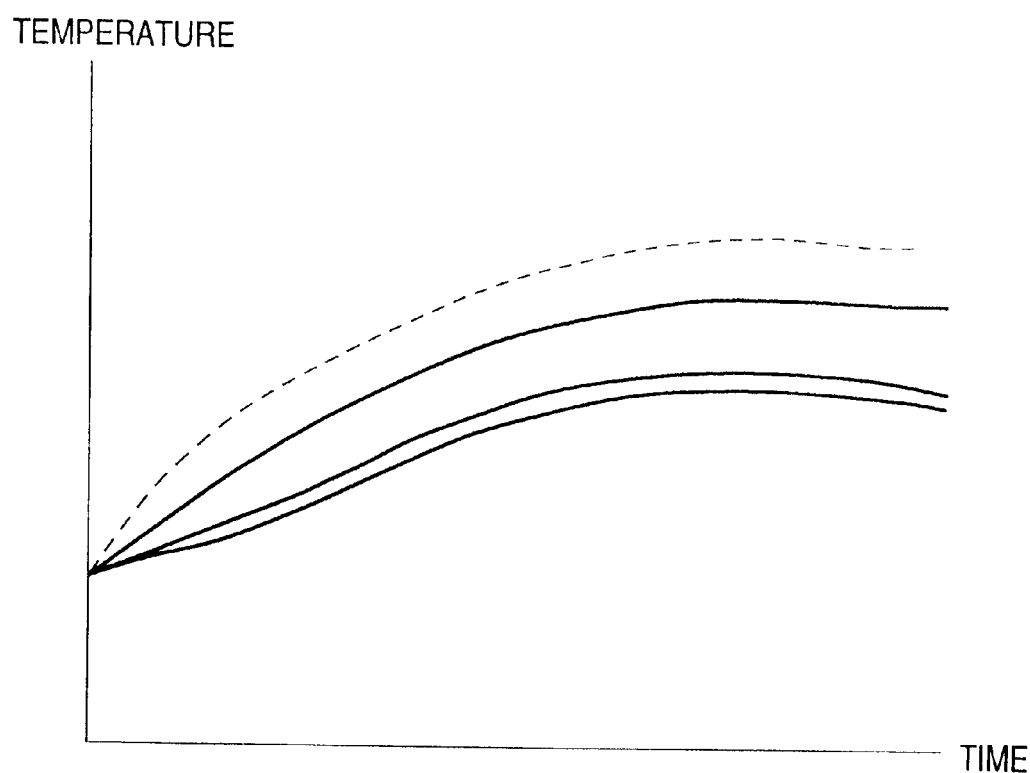
FIG. 18 is a graph of temperature curves.
Figure 19:
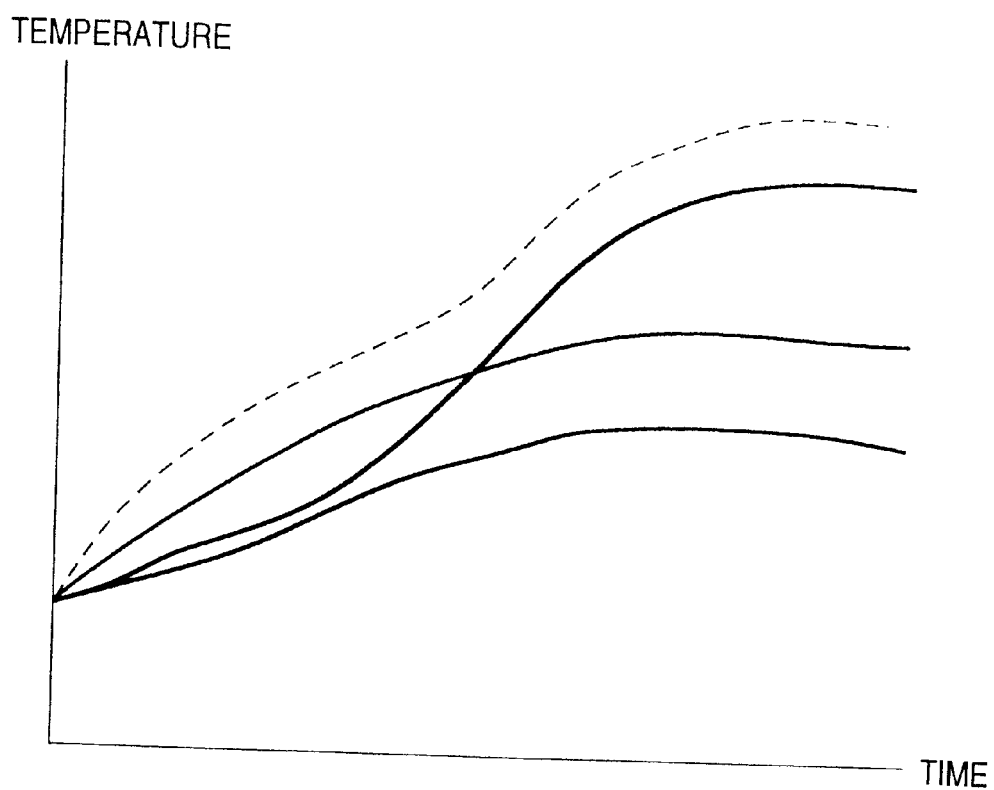
FIG. 19 is a graph of temperature curves.

FIGS. 18 and 19 are graphs obtained when, in the apparatus of FIG. 8, the temperature changes of the respective support members are measured and the expansion of the respective support members is adjusted by heating them, so that parallelism of the flat plate is maintained. In this case, the temperatures of the support members are set higher than the measured temperatures, so that the sizes of the support members upon expansion are maintained stable as a whole, thereby guaranteeing parallelism of the flat plate.

In the above manner, when heating means supported by a plurality of support members to heat a member to be heated is provided and the support members are temperature-controlled separately, parallelism of the flat plate can be guaranteed.

The temperatures of the respective support members are controlled separately to maintain high flatness of the flat plate.

Data on the respective support members are compared. The temperatures of other support members are controlled to follow the temperature condition of the support member, among the respective support members, which is at a high temperature, thus guaranteeing high flatness of the heating flat plate.

The thermal processing precision of the member to be heated is improved.

Due to the chain connection, an adverse influence of expansion of the respective support members upon their temperature increase can be suppressed.

The temperatures of the respective support members are controlled on the basis of the temperature data of the storage. Therefore, a heating apparatus with a heating flat surface having a highly guaranteed flatness can be obtained.

Figure 20:
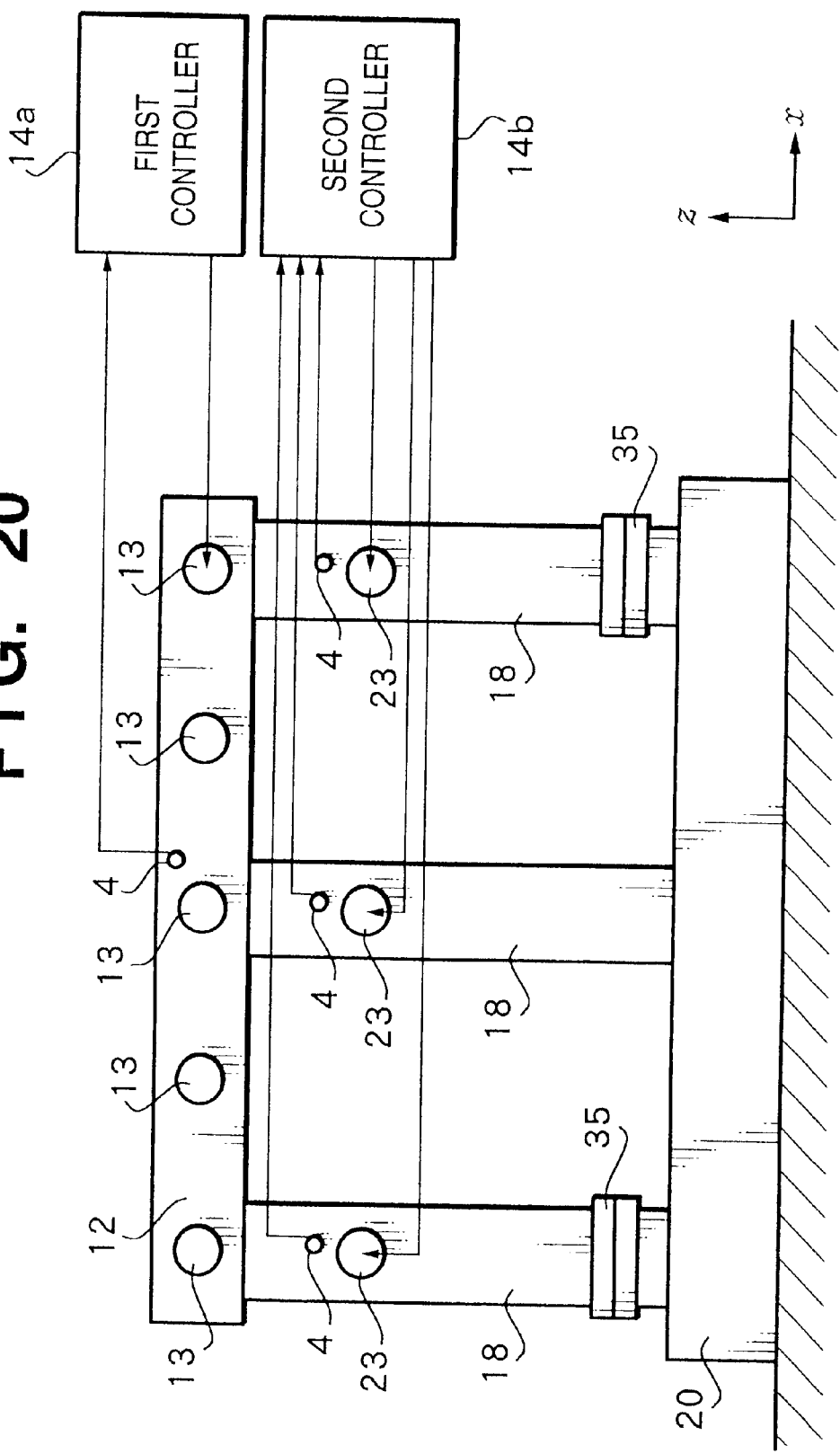
FIG. 20 is a view showing the eighth embodiment of the present invention.

FIG. 20 shows the eighth embodiment. In FIG. 20, the building components identical to those that have already been described are denoted by the same reference numerals, and a repetitive description will be omitted. In the above embodiments, the expansion amounts of the respective support members are controlled by heating the respective support members 18 to guarantee the flatness of the plate 12. In the eighth embodiment, the expansion amounts of the respective support members are managed by cooling the support members to guarantee the flatness of the flat plate. Referring to FIG. 20, cooling means 23 cool the respective support members.

A second controller 14b receives information from sensors 4 that measure the temperatures of the respective support members, and outputs operation signals to the cooling means 23.

Figure 21:
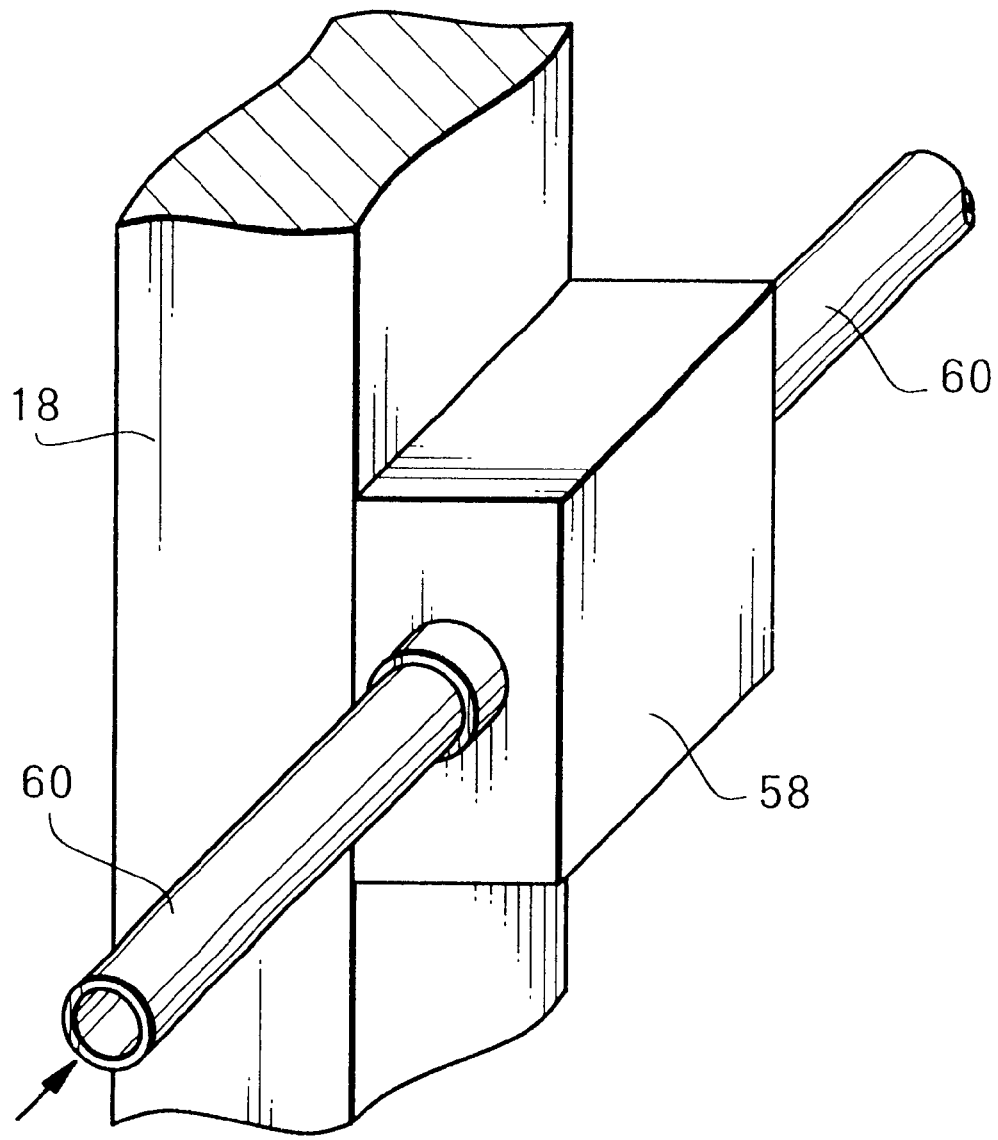
FIG. 21 is a view explaining the arrangement of a coolant flow path.
Figure 22:
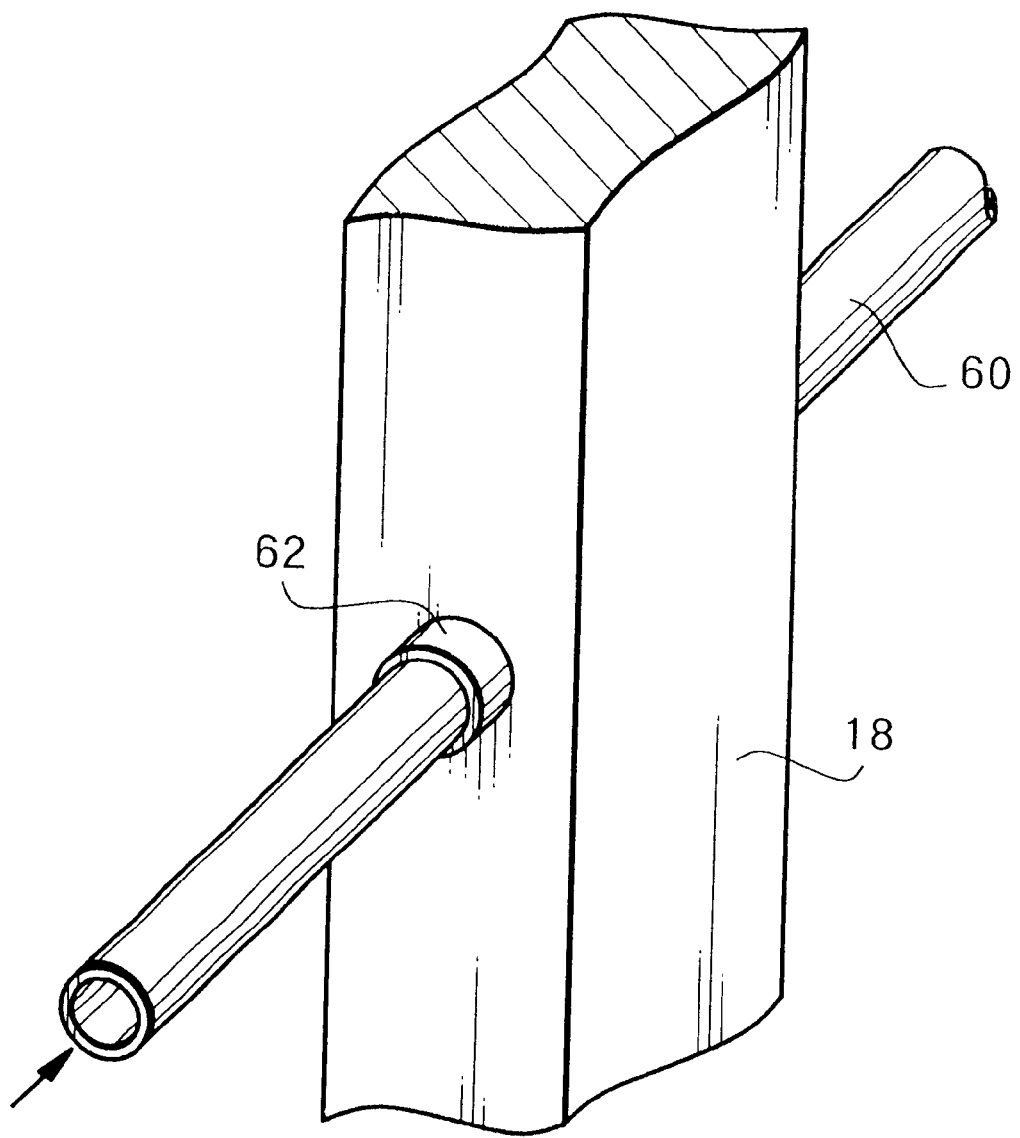
FIG. 22 is a view explaining the arrangement of a coolant flow path.

FIGS. 21 and 22 show the arrangement of the main part of each cooling means, in which FIG. 21 shows a cooling means attached to the support member, and FIG. 22 shows a cooling means buried in the support member.

Referring to FIG. 21, a coolant container 58 for circulating a coolant is attached to the support member. The coolant container 58 deprives the support member of heat with the coolant in it, thereby decreasing the temperature of the support member. Reference numeral 60 denotes a coolant circulating pipe.

Referring to FIG. 22, a coolant passing pipe 62 is buried in a through hole extending through the support member 18. When the coolant from a circulating pipe passes through the coolant passing pipe 62, it deprives the support member of heat, thereby managing the temperature of the support member.

Figure 23:
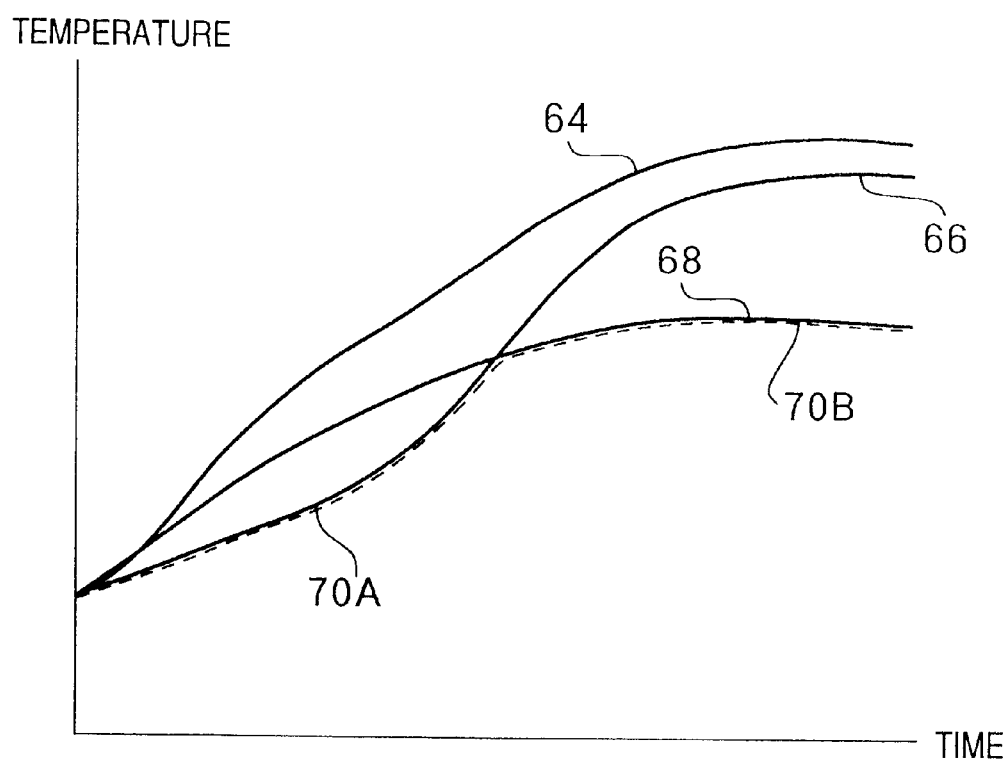
FIG. 23 is a graph of temperature curves.
Figure 24:
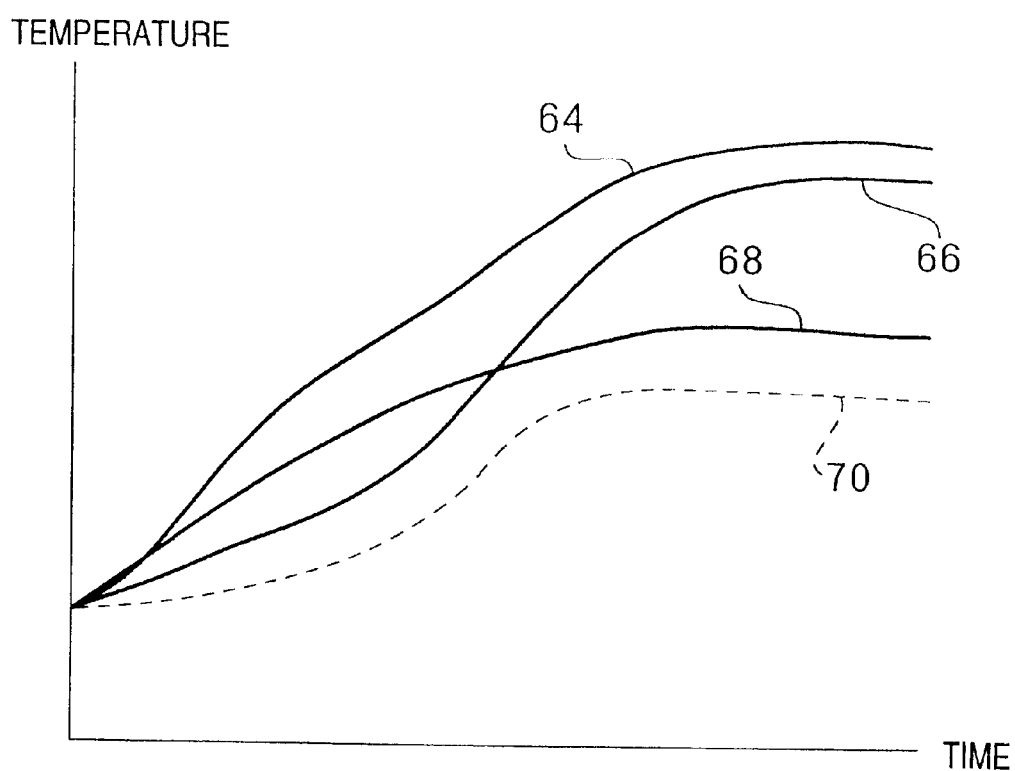
FIG. 24 is a graph of temperature curves.

FIGS. 23 and 24 show the temperature curves of temperature control of the support members according to this embodiment. The operation/function of this embodiment will be described.

The respective support members form temperature curves 64, 66, and 68 as shown in FIG. 23 that are different in units of support members depending on the accessory members attached to them or their positions. Concerning the size of the support member, when the temperature change is the smallest, the expansion amounts of the respective portions become small. Therefore, the temperatures of the respective support members are detected by the sensors. The supply amount and temperature of the coolant to be supplied to each respective coolant circulating path are adjusted through the second controller such that the temperatures of other support members follow the temperature of the support member having the smallest temperature. As a result, temperature control is performed as indicated by reference numerals 70A and 70B in FIG. 23.

In the case of FIG. 24, data on the temperature history curves of the respective support members are measured in advance, and suitable temperatures of the respective support members are obtained through experiments in advance. The support members are cooled to show a stable temperature curve indicated by a broken line.

As described above, the temperatures of the support members that support a heat transfer plate as a heating flat plate are controlled, so high flatness of the flat plate is guaranteed and high thermal processing precision is guaranteed.

Figure 25:
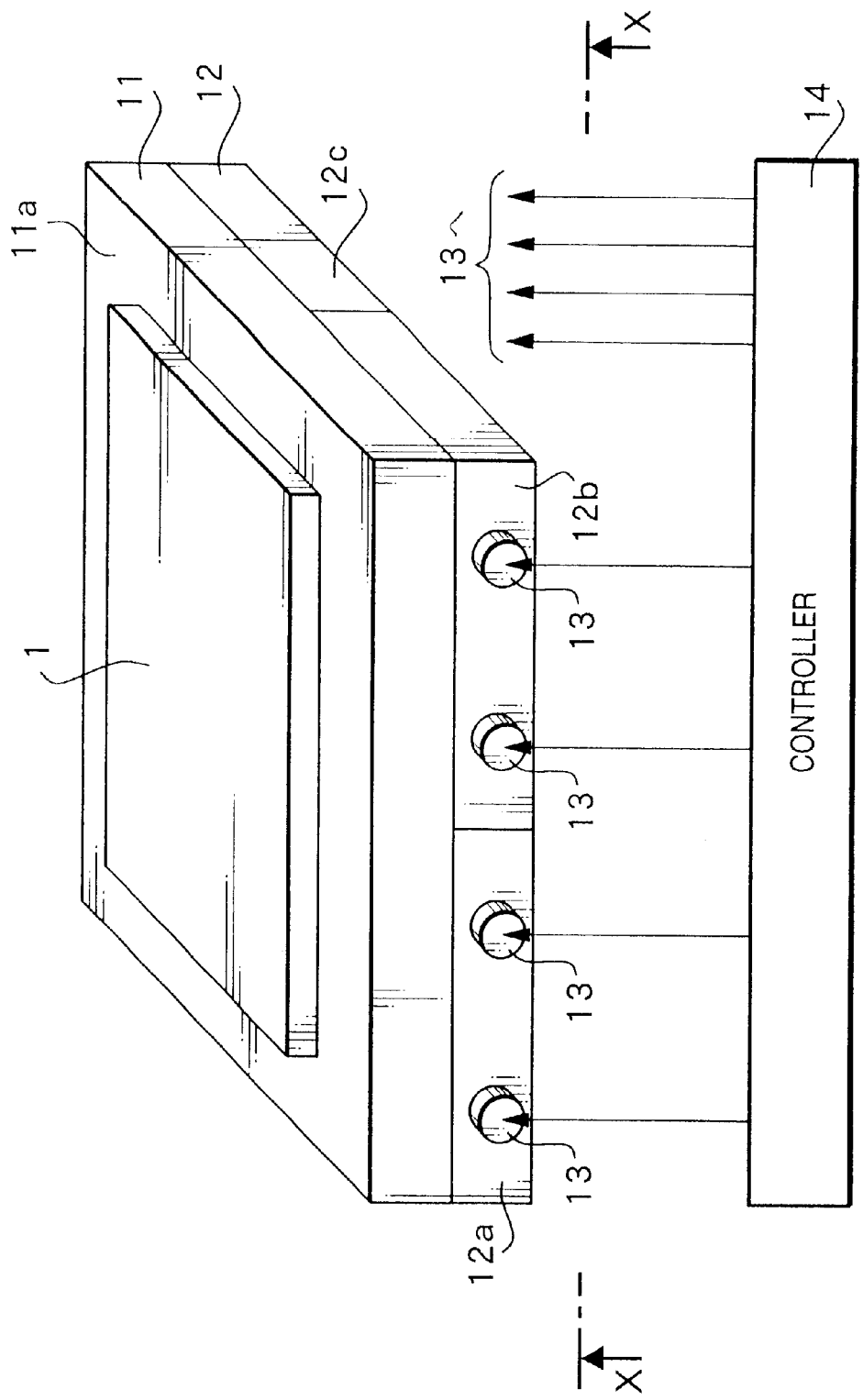
FIG. 25 is a view showing the arrangement of a heating apparatus according to the ninth embodiment of the present invention.
Figure 26:
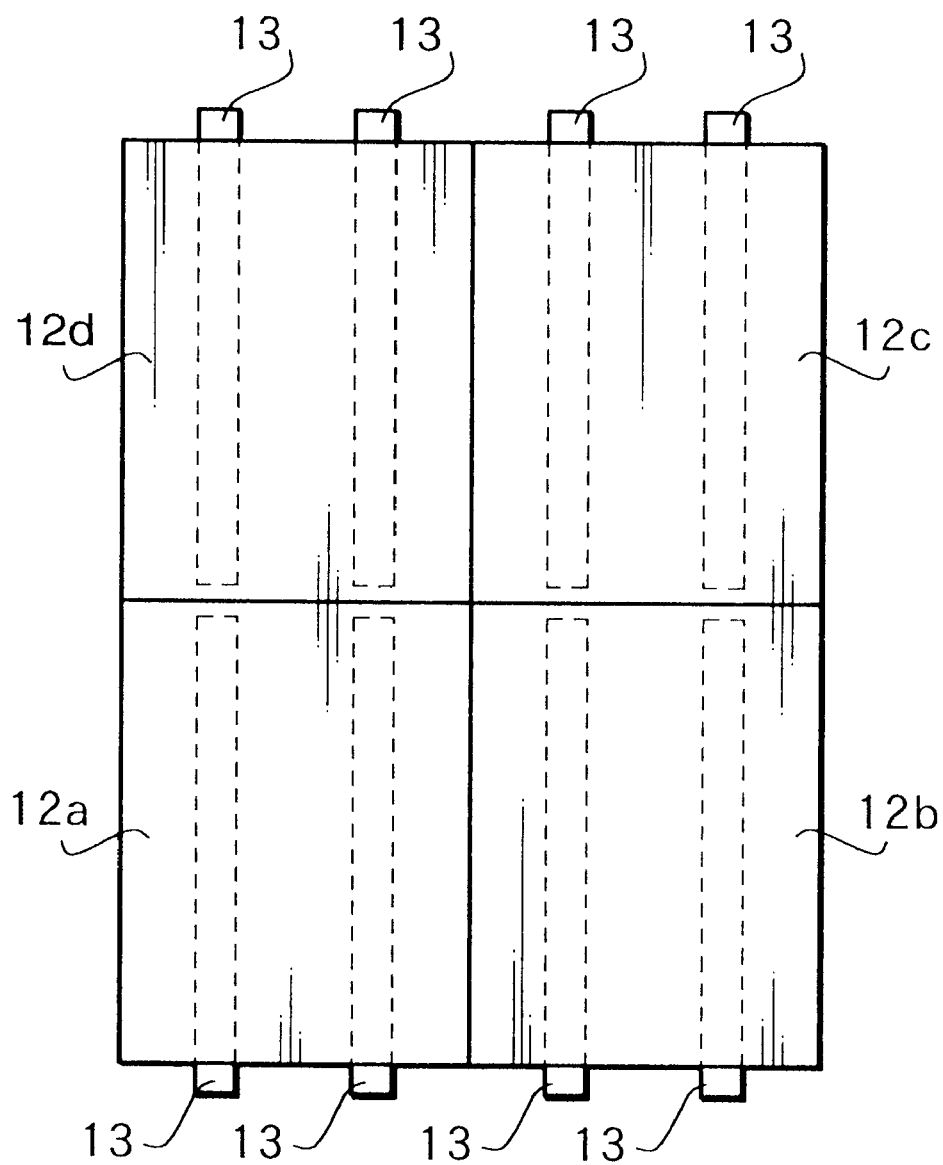
FIG. 26 is a view showing the arrangement of the heaters of FIG. 25.

FIG. 25 is a perspective view showing the arrangement of a heating apparatus according to the ninth embodiment of the present invention. FIG. 26 is a plan view of FIG. 25 seen from below.

Referring to FIGS. 25 and 26, the building components identical to those that have already been described are denoted by the same reference numerals, and a repetitive description will be omitted. A heat transfer plate 12 is provided under a base plate 11 to be fixed to it. Holes for inserting rod heaters 13 are formed in the heat transfer plate 12. The rod heaters 13 are connected to a controller 14 for controlling outputs from the heaters 13. An object 1 to be heated is placed on the surface of the base plate 11 directly or through a small gap.

The base plate 11 is fixed by a support member (not shown). The baseplate 11 is a plate made of a material having a higher strength and smaller creep than the heat transfer plate 12. The heat transfer plate 12 is a plate made of a material having a lower strength but a larger thermal conductivity than the base plate 11. The base plate 11 and heat transfer plate 12 are stacked and fixed to each other. The heat transfer plate 12 is divided into four plate members 12a, 12b, 12c, and 12d, as shown in FIG. 26, to enable heater hole formation. Two heaters 13 are inserted in each of the heat transfer plates 12a, 12b, 12c, and 12d, as shown in FIG. 26.

With the above arrangement, the controller 14 causes the heaters 13 to generate heat on the basis of a signal from at least one temperature sensor (not shown) placed on the base plate 11 or heat transfer plate 12. Heat generated by the heaters 13 is radiated toward the corresponding heat transfer plates 12a, 12b, 12c, and 12d where the heaters 13 are set. This heat diffuses in the heat transfer plates 12a, 12b, 12c, and 12d having a larger thermal conductivity than the base plate 11, and is transferred to the object 1 to be heated through the base plate 11. More specifically, heat of the heaters is immediately transferred in the heat transfer plate 12, and is conducted through the base plate 11 with a small in-plane temperature distribution in the direction of plate thickness. Therefore, the object 1 to be heated placed on the surface of the base plate 11 can be increased in temperature while maintaining its in-plane temperature distribution small.

In particular, when a material having small creep is used to form the base plate 11, heating with good surface precision can be realized even under a high temperature. For example, with a 400-mm square heating apparatus, an in-plane temperature distribution of ±3° C. or less near 200° C. and ±5° C. or less near 400° C. is achieved. Even when a heat cycle from room temperature to 400° C. or more is applied to the plate, any warp of the plate is suppressed to 0.2 mm or less.

As shown in FIG. 26, the cartridge heaters 13 are inserted in each of the plurality of divided heat transfer plates 12a to 12d. The heater length can accordingly be more decreased than in a case wherein only one heat transfer plate 12 is used. As a result, the diameter of the heaters 13 can be further reduced, and the thickness of the heat transfer plates 12 into which the heaters are inserted can be reduced. When the heating apparatus is formed in the above manner, the heat capacity of the plate can be decreased, and a weight reduction effect and an effect of decreasing the power consumption and heating and cooling times can be obtained.

The main specifications of the respective members used in the above embodiments are as follows.

base plate 11: stainless steel
(thermal conductivity: 10 to 30 W/mK)
heat transfer plate 12: aluminum alloy
(thermal conductivity: 100 to 240 W/mK)
fixing method: bolt fastening
(M4, torque management: 10 to 40 kgf·cm)
flatness of contact surface: 0.05
surface roughness of contact surface: $^\nabla 1.6$ FIG. 27 is a view showing the tenth embodiment of the present invention.

In the tenth embodiment, in a heating apparatus identical to that of FIG. 25, an auxiliary plate 16 is set on that side of heat transfer plates 12a to 12d, which is opposite to a base plate 11. The auxiliary plate 16 is made of a material having a coefficient of thermal expansion and a Young's modulus closer to those of the base plate 11 than those of the heat transfer plates 12a to 12d. The auxiliary plate 16 suppresses deformation by the bimetal effect due to a difference in coefficient of thermal expansion when the temperature of the heating apparatus increases. Since the heat transfer plate is divided and heaters are inserted in the divided plates also in FIG. 27, the heater diameter can be decreased and the plate thickness can be decreased accordingly.

Figure 28:
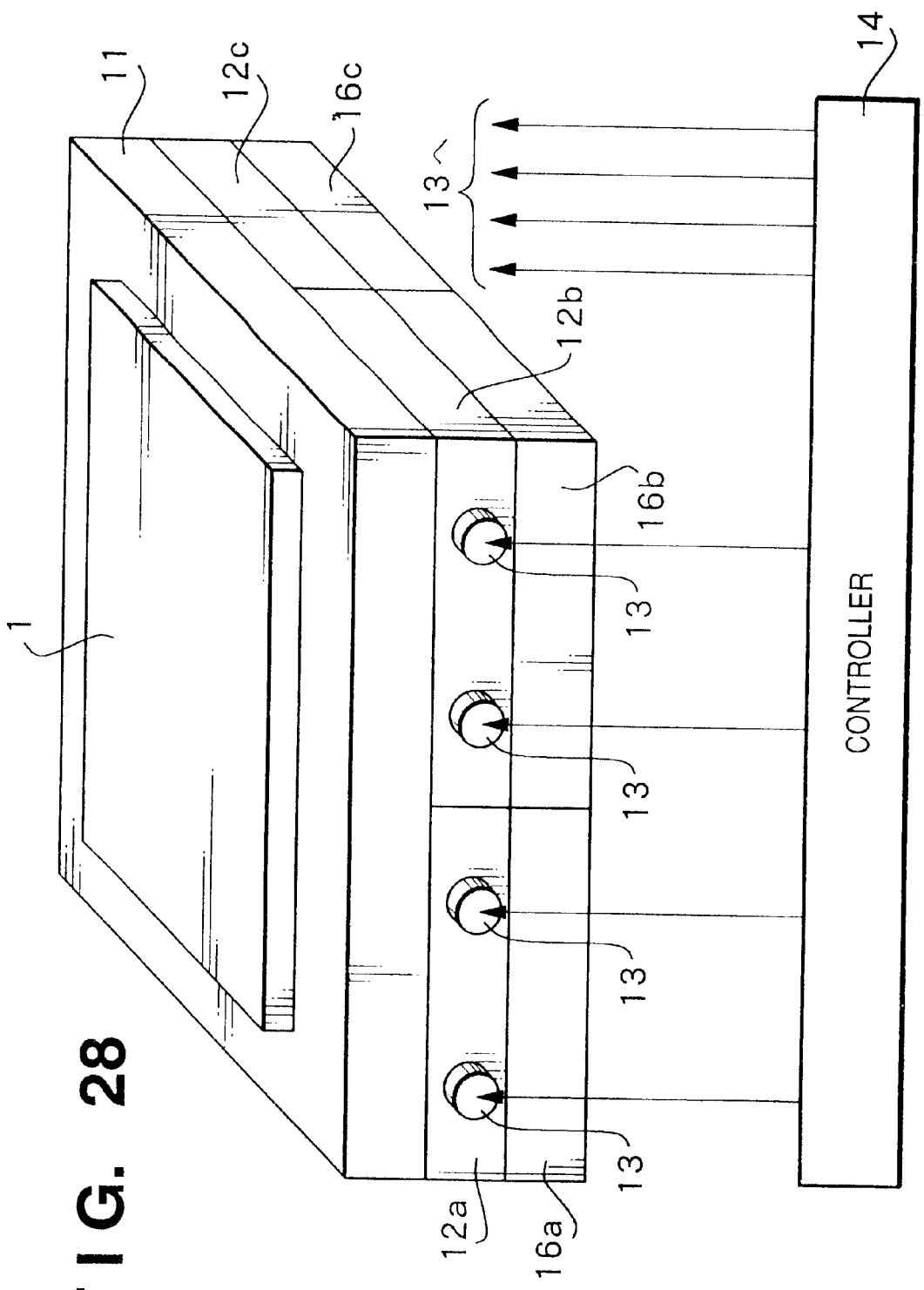
FIG. 28 is a view showing the arrangement of a heating apparatus according to the eleventh embodiment of the present invention.

FIG. 28 is a view showing the eleventh embodiment of the present invention.

Figure 27:
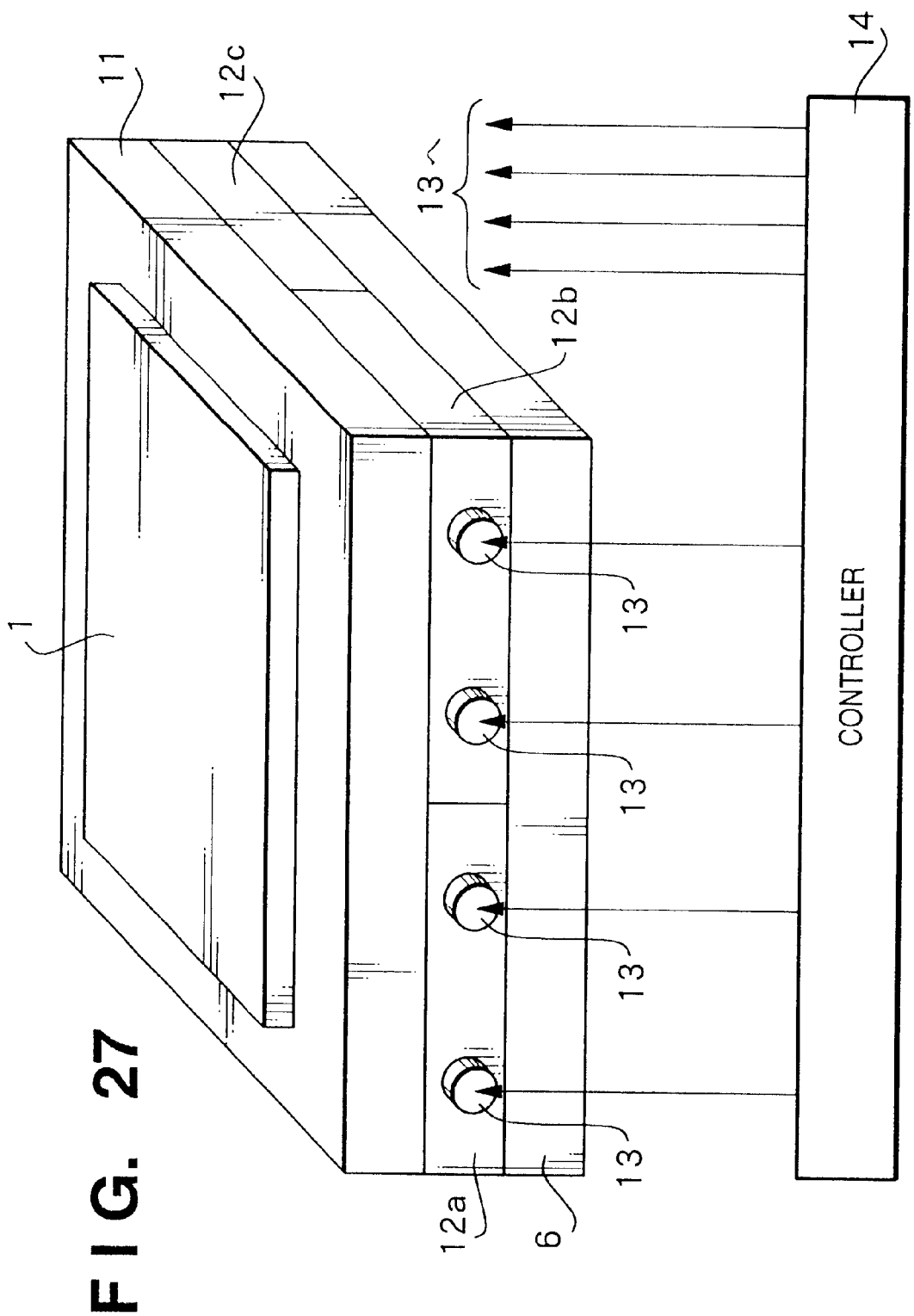
FIG. 27 is a view showing the arrangement of a heating apparatus according to the tenth embodiment of the present invention.

The eleventh embodiment is obtained by dividing the auxiliary plate 16 of the heating apparatus shown in FIG. 27. Reference numerals 12a to 12d (12d is not shown) denote divided auxiliary plates. Since each divided auxiliary plate is smaller than the auxiliary plate 16 of the heating apparatus of FIG. 27, it has a good processability, and facilitates heater wire connection and assembly of the apparatus. Heat transfer plates 12a to 12d (12d is not shown) are set as divided, and heaters are inserted in each of them, which is the same as in the apparatus of FIG. 27. In the eleventh embodiment as well, the plate thickness can be decreased similarly.

As in the ninth to eleventh embodiments, when the heat transfer plate into which the heaters of a heating apparatus are to be inserted is divided, the thickness of each divisional heat transfer plate can be decreased, and the heat capacity of the plate can accordingly be decreased. Hence, a weight reduction effect and an effect of decreasing the power consumption and heating and cooing time can be obtained.

Figure 29:
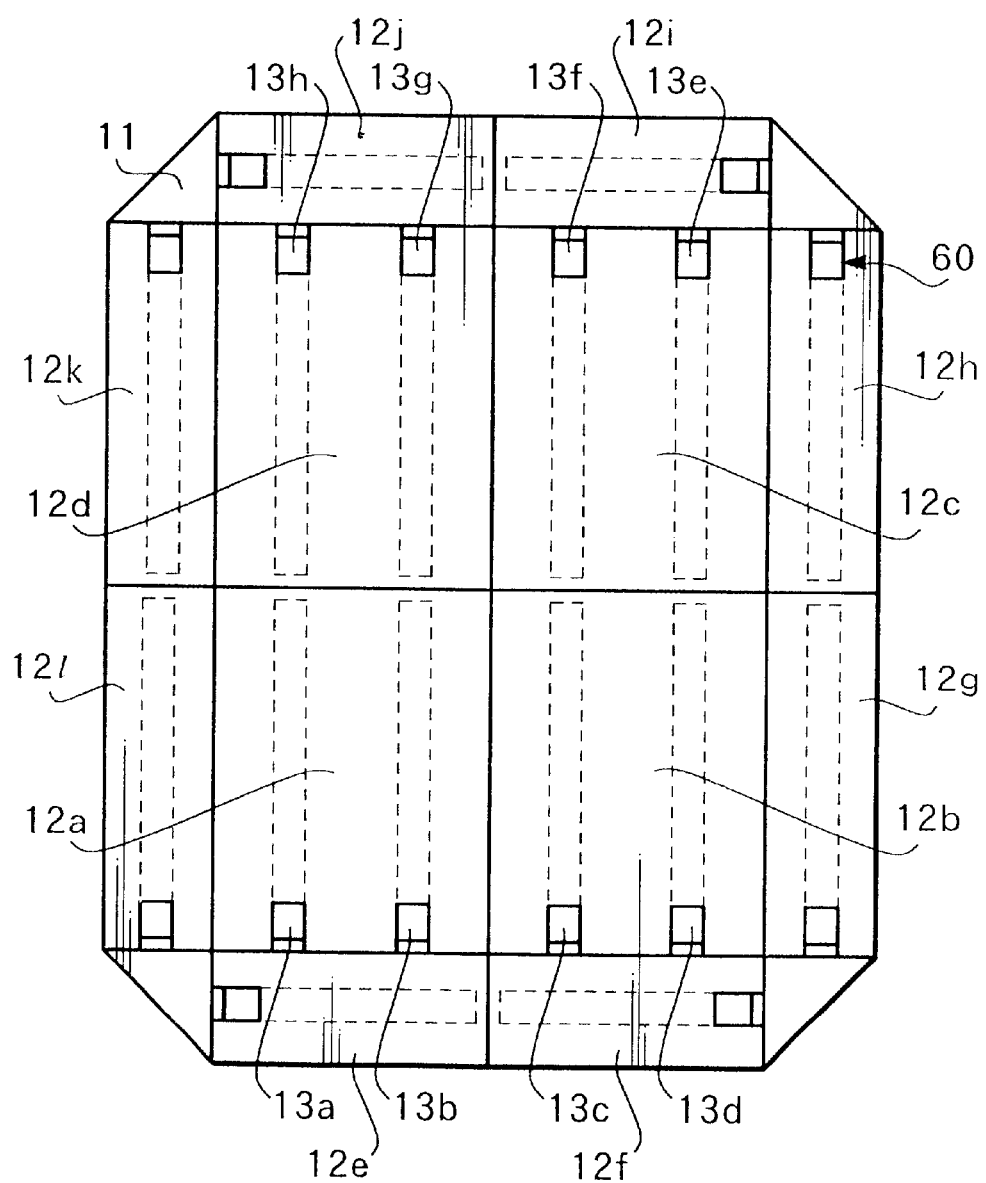
FIG. 29 is a view showing the arrangement of a heating apparatus according to the twelfth embodiment of the present invention.

FIG. 29 shows the twelfth embodiment of the present invention, and is a sectional view, taken along the line of arrows X—X of FIG. 25, of a heating apparatus seen from below. FIG. 29 shows the positional relationship between heat transfer plates 12 and heaters 13.

Referring to FIG. 29, reference numerals 12a to 12L denote heat transfer plates; and 13a to 13h, heaters. The heaters 13a and 13b, 13c and 13d, 13e and 13f, and 13g and 13h are inserted in the heat transfer plates 12a, 12b, 12c, and 12d, respectively. One heater is inserted in each of the heat transfer plates 12e to 12L as well. Each heater is a cartridge heater, and a lead wire (not shown) for power supply is connected to its one end. For this purpose, a lead wire connecting space is formed on each heat transfer plate and auxiliary plate, as indicated by reference numeral 60 in FIG. 29.

Referring to FIG. 29, in the same manner as in the eleventh embodiment, heat generated by the heaters is transferred into the heat transfer plates 12 immediately, is conducted through the base plate 11 with a small in-plane temperature distribution in the direction of plate thickness, and uniformly heats an object 1 to be heated placed on the base plate 11. Since the heaters are respectively inserted in the plurality of divisional heat transfer plates, they can be made short and thin, thereby reducing the thickness of the heat transfer plates.

As shown in FIG. 29, heat transfer plates into which heaters are to be inserted can be formed into desired shapes in accordance with how the heaters are arranged. As a consequence, the heaters can be arranged without intersecting each other. In the conventional case, in order to prevent interference of the heaters at the intersecting portions, the heaters are arranged to be shifted from each other in the direction of plate thickness, which undesirably increases the thickness of the plate. However, such a problem does not arise in this embodiment.

The temperature of the plate peripheries of the heating apparatus increases due to heat dissipation from their side surfaces. In this respect, if the heaters are set on the periphery, as shown in FIG. 29, and their outputs are controlled separately, heat dissipation from the side surfaces can be compensated for, thus reducing temperature distribution.

When the respective heaters are mounted freely without increasing the thickness of the plate of the heating apparatus and are temperature-controlled separately, any in-plane temperature distribution can be reduced. For example, with an 800-mm square heating apparatus, an in-plane temperature distribution of ±3° C. or less near 200° C. and ±5° C. or less near 400° C. is achieved.

When the heating apparatus is formed in the above manner, finer temperature control can be performed, so that the temperature distribution can be reduced without increasing the weight or heat capacity. Except for this, the effect of this embodiment is the same as those of the above embodiments.

Figure 30:
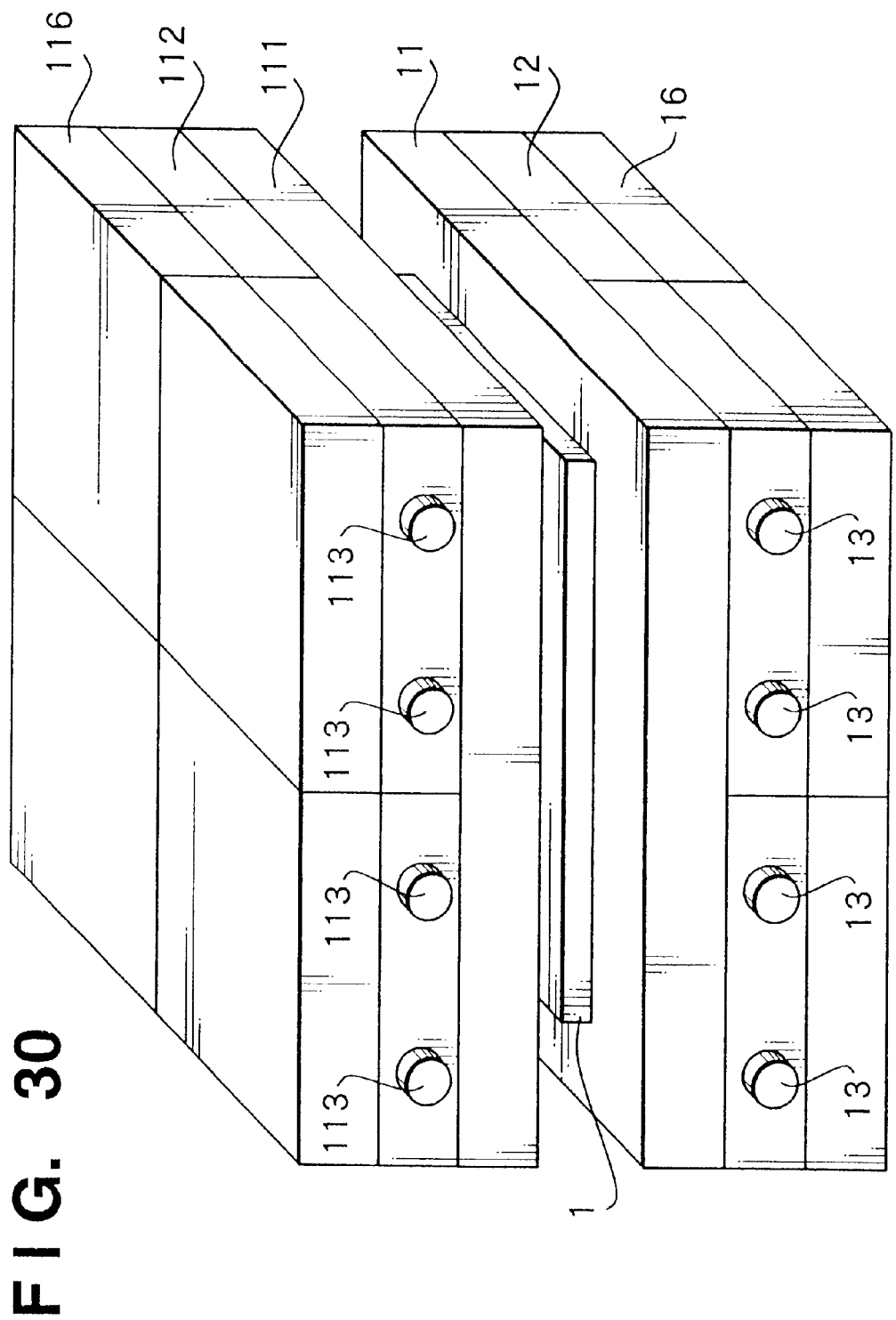
FIG. 30 is a view showing the arrangement of a heating apparatus according to the thirteenth embodiment of the present invention.

FIG. 30 is a view showing the thirteenth embodiment of the present invention.

The thirteenth embodiment is obtained by adding, to the heating apparatus shown in FIG. 28, another identical heating apparatus upside down on the opposite side of an object to be heated.

The heating apparatuses sandwich an object 1 to be heated with base plates 11 and 111. Heat transfer plates 12 and 112 and auxiliary plates 16 and 116 are stacked on the base plates 11 and 111. Heaters 13 and 113 are inserted in the heat transfer plates 12 and 112. A temperature sensor provided to each heating apparatus and a controller for controlling outputs from the heaters by referring to temperature data from the temperature sensor are not shown. Heat radiated from the heaters is transferred through the heat transfer plates and base plates to uniformly heat the object to be heated in the same manner as in the above embodiments.

In the above arrangement, since the base plates 11 and 111 heat the object 1 to be heated by sandwiching it from the two surfaces, the heating rate can be increased. Since no heat is radiated from the open surface of the object 1 to be heated of the ninth to twelfth embodiments, i.e., from a surface of the object 1 to be heated which is not set on the heating apparatus, the heat flow in the object 1 to be heated in the direction of plate thickness decreases, and the temperature distribution in this direction is also reduced. Since the heat transfer plates 12 and 112 are divided, the heater diameter can be decreased, and accordingly the plate thickness of the heating apparatus can be decreased. Although the object 1 to be heated is not in contact with the base plate 111 in this embodiment, it may be in contact with the base plate 111. In this case, the heat transfer efficiency to the object 1 to be heated improves.

The heater arrangement of this embodiment is merely an example and based on FIG. 26. Other arrangements as shown FIG. 29 may be employed.

When the heating apparatus is constructed in the above manner, the object to be heated can be heated more efficiently such that the temperature difference between its two surfaces is decreased. The other effects are identical to those described in the above embodiments.

According to the arrangement described above, the heat capacity of the plate of the heating apparatus can be decreased, so a weight reduction effect and an effect of decreasing the power consumption and heating and cooling times can be obtained. Also, an effect of reducing any in-plane temperature distribution without increasing the weight or heat capacity, thus reducing deformation of the object to be heated, can also be obtained. Also, the object to be heated can be heated more efficiently such that the temperature difference between its two surfaces is decreased.

Figure 31:
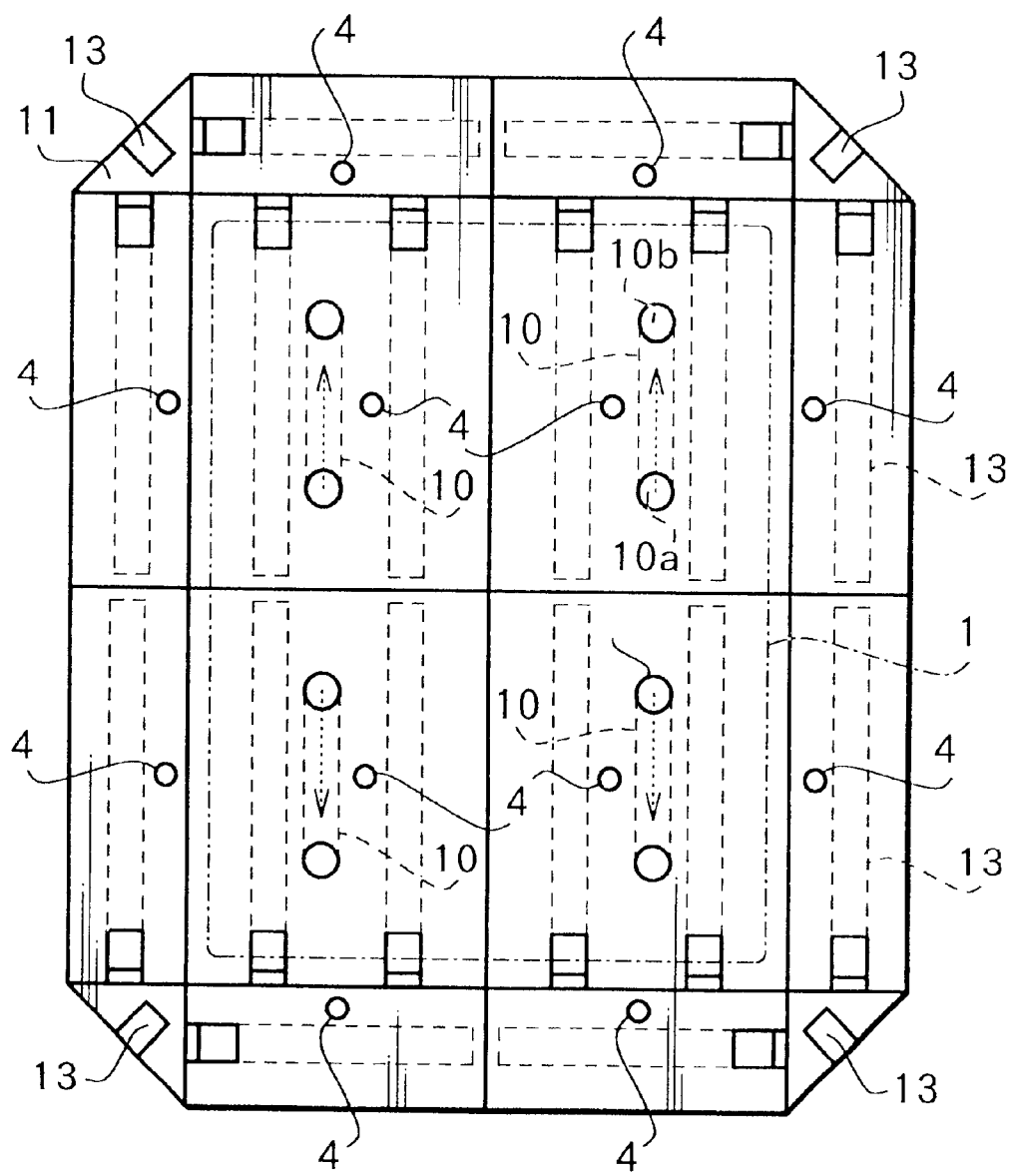
FIG. 31 is a sectional view taken along the line of arrows X—X of FIG. 25.

FIG. 31 is a sectional view, taken along the line of arrows X—X of FIG. 25, of the heating apparatus seen from below. The building components identical to those that have already been described are denoted by the same reference numerals, and a repetitive description will be omitted. The rod heaters 13 are disposed as indicated by broken lines in FIG. 31. Air flow paths 10 indicated by broken lines are formed among the rod heaters 13 to cool them. Each air flow path 10 forms an air inlet port 10a and outlet port 10b, and flows cooled air in a direction of arrow, thereby cooling the plate 12. Temperature sensors 4 are provided near the air flow paths 10 and therespective heaters 13. More heaters 13 are provided at the corner portions shown in FIG. 31 to enable uniform heating until the edge portions of the object 1 to be heated indicated by an alternate long and a short dashed line in FIG. 31.

Figure 32:
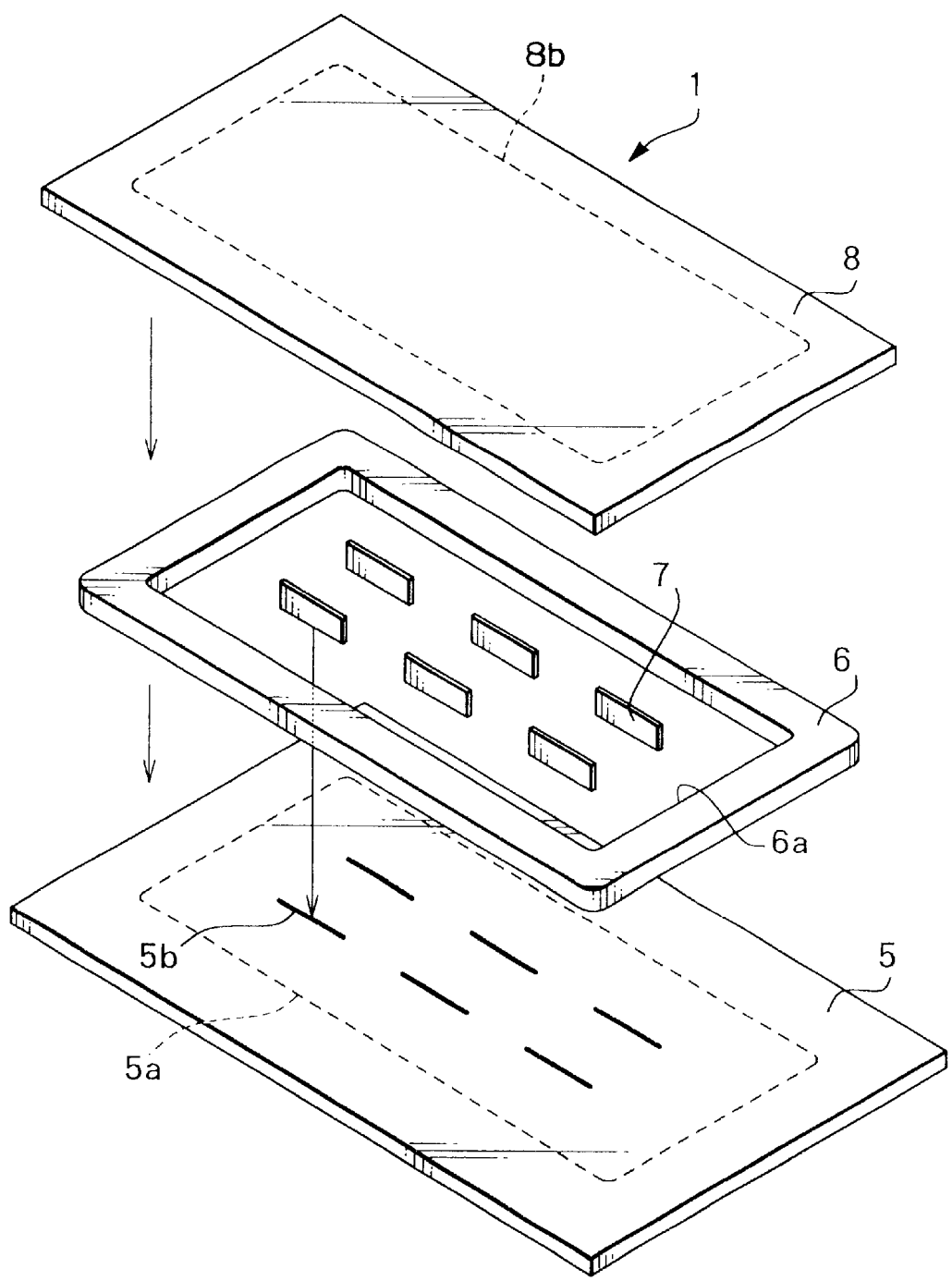
FIG. 32 is an exploded perspective view showing an actual example of the object to be heated.

FIG. 32 is an exploded view showing a flat surface type image display, as an example of the object 1 to be heated, using surface conduction type electron emission elements.

Referring to FIG. 32, a face plate 8 as the first glass plate and a rear plate 5 as the second glass plate are integrated through a frame 6 provided at their edge portions, and a plurality of spacer members 7 are fixed at predetermined positions in a space 6a of the frame 6 with low-melting glass.

More specifically, the surface conduction type electron emission elements surface 5a is formed on the rear plate 5 in advance, which corresponds to the display surface 8b shown by a broken line of the face plate 8. The plurality of spacer members 7 are fixed at predetermined portions 5b of the elements surface 5a with frit seal as low-melting glass, and the face plate 8 is fixed with frit seal as low-melting glass, so that the elements surface 5a is set in vacuum.

Figure 33:
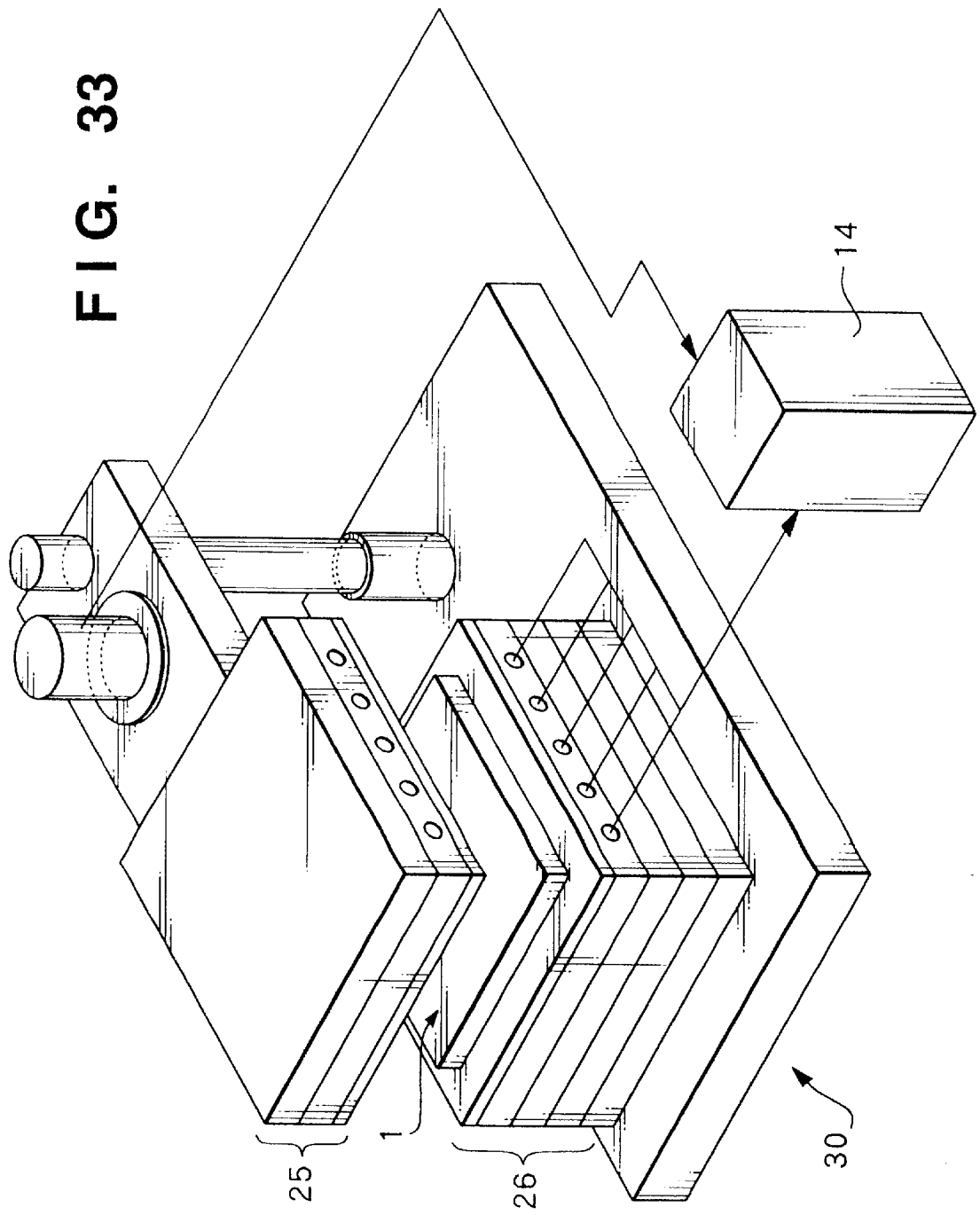
FIG. 33 is a perspective view of the outer appearance of a heating apparatus 30.

For this purpose, a heating apparatus 30 as shown in FIG. 33 is used. The heating apparatus 30 holds the object 1 to be heated by sandwiching it with upper and lower hot plates 25 and 26 and heats it with heating means. A detailed description of the heating apparatus 30 will be omitted.

Figure 34A:
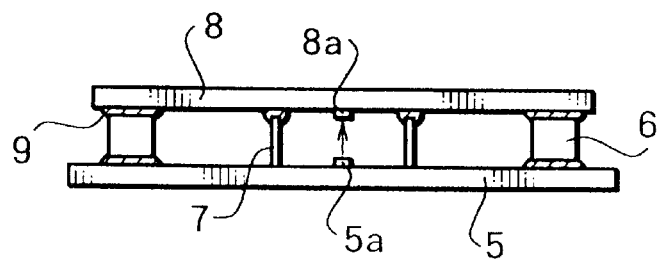
Figure 34B:
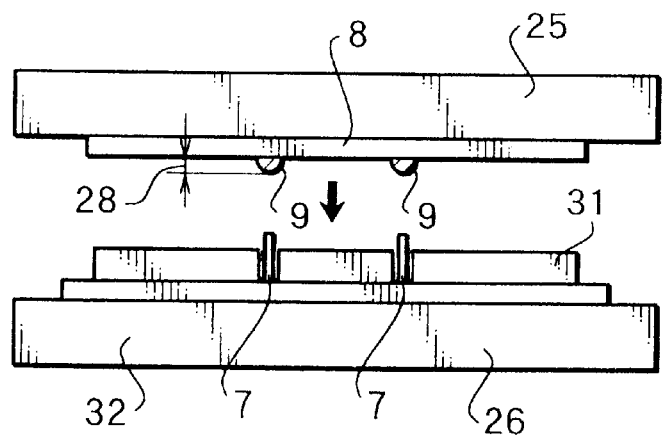
Figure 34C:
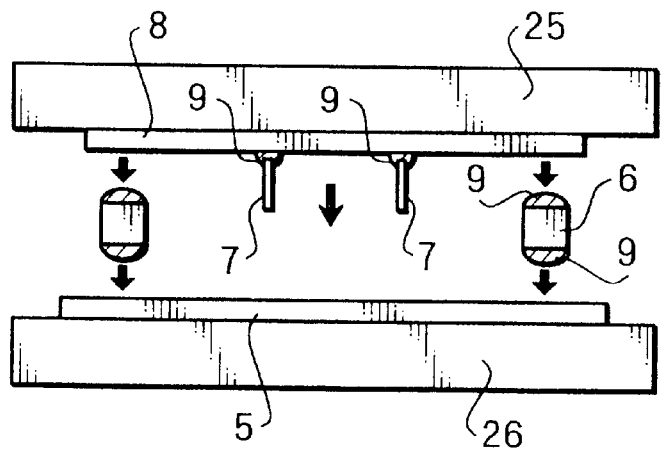

FIGS. 34A to 34C are views showing steps in the fixing process of the heating apparatus 30 shown in FIG. 33, in which FIG. 34A shows the flat surface type image display upon completion of manufacture, FIG. 34B shows a step during the manufacture, and FIG. 34C shows the final step.

Referring to FIG. 34A, the face plate 8 as the first glass plate and the rear plate 5 as the second glass plate are integrated through the frame 6 provided at their edge portions, and the plurality of spacer members 7 are fixed at predetermined positions of the space 6a of the frame 6 with low-melting glass indicated by hatched portions in FIGS. 34A to 34C. After the display is finished, the resultant structure is set in a predetermined vacuum pressure and is energized, so that an electron beam from the elements surface 5a reaches to a phosphor on the display surface 8a to display a predetermined image.

Referring to FIG. 34B, before the display is finished, an auxiliary plate 32 formed of a glass plate is held on the lower hot plate 26 by suction. A jig 31 is placed on the auxiliary plate 32 to position the spacer members 7 in the jig 31. The face plate 8 is coated with low-melting glass 9 for a height 28 at portions corresponding to the spacer members 7 in advance, and is held on the upper hot plate 25 by suction.

In this state, the upper hot plate 25 is moved down in the direction of arrow to sandwich the spacer members 7 from above and below. Almost simultaneously, the heaters are energized, and the spacer members 7 are fixed to the face plate 8.

Figure 35A:
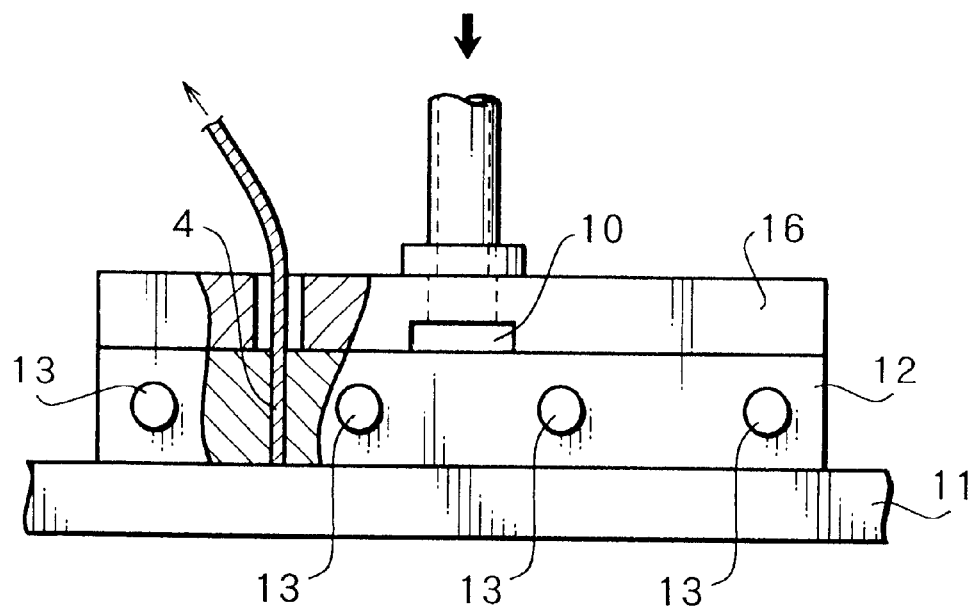
FIG. 35A shows an air flow path formed in an auxiliary plate.
Figure 35B:
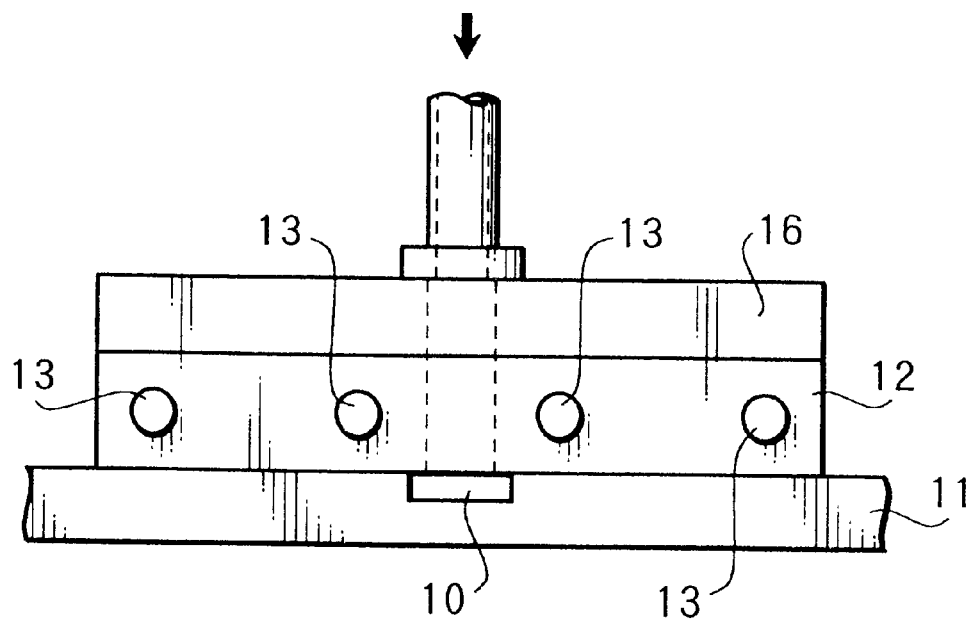
FIG. 35B shows an air flow path formed in a base plate.

Then, cooling air is introduced to the air flow paths 10, as shown in FIG. 35A, to decrease the temperature. Alternatively, cooling air is introduced to the air flow paths formed in the base plate 11, as shown in FIG. 35B. The upper hot plate is moved up to stand by, and the spacer members 7 are fixed to it, as shown in FIG. 34C. The auxiliary plate 32 is then removed, the rear plate 5 is placed on the lower hot plate 26, and the frame 6 coated with the low-melting glass 9 at its upper and lower surfaces is set on the rear plate 5. The rear plate 5 is sandwiched by the upper and lower hot plates 25 and 26, and is heated by energization.

Figure 36:
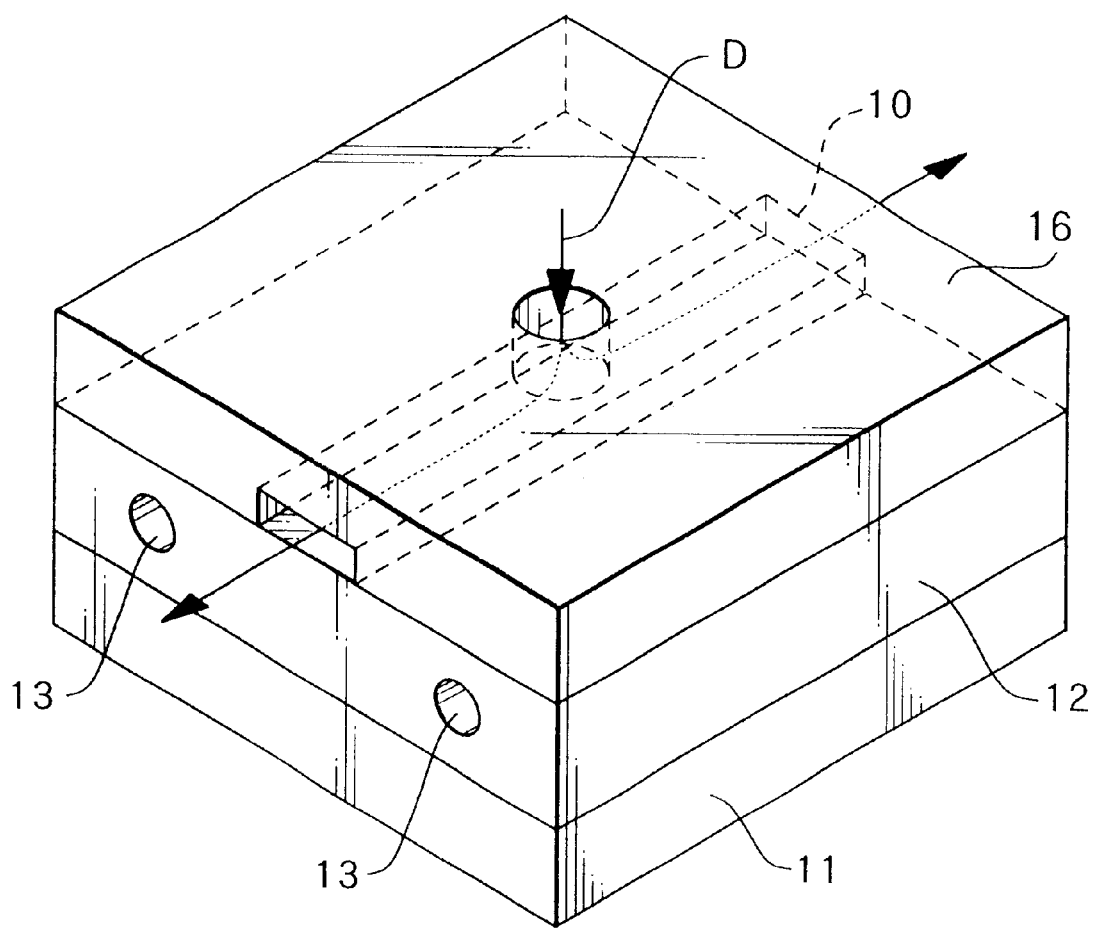
FIG. 36 is a perspective view of the outer appearance for explaining the operation of the air flow path.

More specifically, when air introduced into the air flow paths 10 is directly discharged to the air, as shown in the perspective view of the outer appearance of FIG. 36, the temperature can be decreased.

When the above steps are performed, the manufacture of a flat surface type image display using surface conduction type electron emission elements can be performed at high yield.

The height of the low-melting glass 9 applied to have the height 28 varies within the range of 0.2 mm to 0.05 mm. A flatness precision for absorbing these variations is required of the base plates of the upper and lower hot plates.

The heating temperature is within the range of 200° C. to 450° C. The plate thickness of the base plate 11 or heat transfer plate 12 is 10 mm. The diameter of the rod heater insertion hole is 6 mm.

As has been described above, according to the present invention, the second plate having smaller creep than the first plate and the first plate having a larger thermal conductivity than the second plate are stacked, so that warp of the first plate by heat of the heaters is suppressed by the second plate having smaller creep, and the object to be heated can be heated by the first plate having a larger thermal conductivity without producing temperature nonuniformity in its heated surface. Hence, unwanted thermal deformation of the object to be heated is suppressed, thus improving the thermal processing precision.

As compared to a heating apparatus using only the second plate having a smaller thermal conductivity, since the first plate having a larger thermal conductivity is stacked, the apparent heat capacity decreases, and the preheat time until the start of the thermal process can be shortened. This decreases the power consumption of the heating apparatus.

The temperatures of the support members that support the flat heating plate are controlled, so that high flatness of the flat plate is guaranteed and high thermal processing precision is guaranteed.

The heat capacity of the plate of the heating apparatus can be decreased, so that a weight reduction effect and an effect of decreasing the power consumption and heating and cooling times can be obtained. Also, an effect of reducing in-plane temperature distribution without increasing the weight or heat capacity, thus reducing deformation of the object to be heated, can also be obtained. Also, the object to be heated can be heated more efficiently such that any temperature difference between its two surfaces is decreased.

As many apparently widely different embodiments of the present invention can be made without departing from the spirit and scope thereof, it is to be understood that the invention is not limited to the specific embodiments thereof except as defined in the appended claims.

What is claimed is:

1. A method of heating a flat plate-like member to be heated, comprising the steps of:

placing said flat plate-like member to be heated on a flat heating plate, supporting said flat heating plate by a plurality of support members, measuring a temperature state of said support members during a heating operation of said flat heating plate, controlling a temperature of said support members on the basis of measured information to provide flatness of said flat heating plate supported by said support members, thereby evenly heating said flat plate-like member to be heated on said flat heating plate.

2. The method according to claim 1, wherein the flat plate-like member to be heated is a flat plate made of a glass material.

3. A method for heating a flat plate-like member, comprising:

a step for placing a flat plate-like member to be heated on a flat heating plate, a step for supporting said flat heating plate by a plurality of support members which are fixed on a base member, a step for heating said flat heating plate, a step for heating said plurality of support members, a step for measuring a temperature of said support members by first sensors, a step for measuring a surface temperature of said flat heating plate by second sensors, a step for controlling a temperature of said support members based on measured information from said second sensors and, a step for heating said support members so that the lengths of said support members are adjusted so as to assure the flatness of said flat heating plate, thus evenly heating said flat plate-like member.

4. A method of heating a flat plate-like member according to claim 3, further comprising a step for placing one of said plurality of support members in the center of said flat plate-like member to be heated, and placing others of said support members at surrounding portions of said flat plate-like member, wherein heating of said support members at the surrounding portions is adjusted according to heat expansion of said support member in the center of said flat plate-like member, thus keeping the distance between said flat heating plate and said base even.

5. A method of heating a member to be heated by placing said member to be heated on a flat heating plate supported by support members, comprising:
- a step of placing said member to be heated on said flat heating plate,
- a step of measuring a temperature of said support members during a heating operation of said flat heating plate,
- a step of controlling a temperature of said support members on the basis of measured temperature information, and
- a step of operation of even heating of said member to be heated by providing flatness of said flat heating plate by controlling a temperature of said support members.

6. A method according to claim 5 wherein a frame member is placed on said member to be heated and said frame member is fixed on said member to be heated by said step of operation of even heating of said member to be heated.

* * * * *

UNITED STATES PATENT AND TRADEMARK OFFICE
CERTIFICATE OF CORRECTION

PATENT NO. : 6,347,535 B2
DATED : February 19, 2002
INVENTOR(S) : Kamata

It is certified that error appears in the above-identified patent and that said Letters Patent is hereby corrected as shown below:

Column 1,
Line 22, "rials" should read -- rial --.

Column 3,
Line 23, "to be" (second occurrence) should be deleted; and
Line 24, "heated" should be deleted.

Column 4,
Line 26, "uppressed" should read -- suppressed --.

Column 7,
Line 42, "The" should begin a new paragraph.

Column 9,
Line 5, "Other" should begin a new paragraph;
Line 6, "he" should read -- the --; and
Line 48, "ha" should read -- 11a --.

Column 18,
Line 26, "12a to 12d (12d" should read -- 16a to 16d (16d --; and
Line 41, "cooing" should read -- cooling --.

Column 22,
Line 24, "plate," should read -- plate, and --; and
Line 51, "sensors and," should read -- sensors, and --.

Signed and Sealed this

Twenty-eighth Day of January, 2003

JAMES E. ROGAN
*Director of the United States Patent and Trademark Office*